US010817791B1

(12) United States Patent
Shoemaker et al.

(10) Patent No.: US 10,817,791 B1
(45) Date of Patent: Oct. 27, 2020

(54) SYSTEMS AND METHODS FOR GUIDED USER ACTIONS ON A COMPUTING DEVICE

(71) Applicant: Google LLC, Mountain View, CA (US)

(72) Inventors: Garth Shoemaker, Sunnyvale, CA (US); Michael Eugene Aiello, Mountain View, CA (US)

(73) Assignee: Google LLC, Mountain View, CA (US)

( * ) Notice: Subject to any disclaimer, the term of this patent is extended or adjusted under 35 U.S.C. 154(b) by 794 days.

(21) Appl. No.: 15/378,021

(22) Filed: Dec. 13, 2016

Related U.S. Application Data

(63) Continuation-in-part of application No. 14/145,596, filed on Dec. 31, 2013, now Pat. No. 9,519,408.

(51) Int. Cl.
G06N 5/04 (2006.01)
G06F 21/62 (2013.01)
G06N 20/00 (2019.01)

(52) U.S. Cl.
CPC ............ *G06N 5/04* (2013.01); *G06F 21/6218* (2013.01); *G06N 20/00* (2019.01)

(58) Field of Classification Search
None
See application file for complete search history.

(56) References Cited

U.S. PATENT DOCUMENTS

| 6,400,996 | B1 | 6/2002 | Hoffberg et al. |
| 6,633,852 | B1 * | 10/2003 | Heckerman ........ G06Q 30/0201 705/26.7 |
| 8,010,676 | B1 | 8/2011 | Battersby et al. |
| 8,484,190 | B1 * | 7/2013 | Igarashi ............... G06F 16/3325 707/707 |
| 2001/0047265 | A1 * | 11/2001 | Sepe, Jr. ................. G10L 15/22 704/275 |
| 2002/0059202 | A1 * | 5/2002 | Hadzikadic ........... G06K 9/6282 |
| 2009/0037013 | A1 * | 2/2009 | Hendler ........... G05B 19/41875 700/103 |
| 2009/0041224 | A1 | 2/2009 | Bychkov et al. |
| 2009/0234784 | A1 | 9/2009 | Buriano et al. |
| 2009/0234876 | A1 | 9/2009 | Schigel et al. |

(Continued)

FOREIGN PATENT DOCUMENTS

| JP | 2010250759 A | 11/2010 |
| JP | 2011090391 A | 5/2011 |

(Continued)

OTHER PUBLICATIONS

International Search Report and Written Opinion for PCT App No. PCT/US2014/071265 dated Jun. 5, 2015, 10 pgs.

(Continued)

*Primary Examiner* — George Giroux
(74) *Attorney, Agent, or Firm* — Honigman LLP; Brett A. Krueger

(57) ABSTRACT

Systems and methods for guided user actions are described, including gathering information associated with a detected first action; applying a predictive model to suggest a second action based on an application of machine learning to the first action and the information; calculating a first confidence level associated with the application of the machine learning to the first action and the information; for the first confidence level exceeding a threshold, providing the second action, and performing the second action or a third action based on user input.

19 Claims, 13 Drawing Sheets

(56) References Cited

U.S. PATENT DOCUMENTS

| | | | |
|---|---|---|---|
| 2010/0287129 A1* | 11/2010 | Tsioutsiouliklis | G06F 16/951 706/46 |
| 2011/0196853 A1 | 8/2011 | Bigham et al. | |
| 2011/0208822 A1 | 8/2011 | Rathod | |
| 2012/0226742 A1 | 9/2012 | Momchilov et al. | |
| 2012/0290662 A1 | 11/2012 | Weber et al. | |
| 2013/0080362 A1* | 3/2013 | Chang | G06Q 30/0255 706/21 |
| 2013/0091087 A1 | 4/2013 | Prakash et al. | |
| 2013/0103742 A1 | 4/2013 | Hsi | |
| 2013/0117208 A1 | 5/2013 | Dousse et al. | |
| 2013/0132330 A1 | 5/2013 | Hurwitz et al. | |
| 2013/0159220 A1 | 6/2013 | Winn et al. | |
| 2013/0218637 A1 | 8/2013 | Bikman et al. | |
| 2013/0304686 A1* | 11/2013 | Antin | G06Q 10/10 706/46 |
| 2014/0059231 A1 | 2/2014 | Choi et al. | |
| 2014/0108309 A1* | 4/2014 | Frank | G07C 13/00 706/12 |
| 2014/0130076 A1 | 5/2014 | Moore et al. | |
| 2014/0171039 A1 | 6/2014 | Bjontegard | |
| 2014/0279793 A1 | 9/2014 | Wohlstadter | |
| 2014/0317031 A1* | 10/2014 | Babenko | G06Q 10/101 706/12 |
| 2014/0372902 A1 | 12/2014 | Bryant et al. | |
| 2014/0372905 A1 | 12/2014 | Bryant et al. | |
| 2015/0081470 A1 | 3/2015 | Westphal | |
| 2015/0134389 A1* | 5/2015 | Punera | G06Q 10/063114 705/7.15 |

FOREIGN PATENT DOCUMENTS

| | | |
|---|---|---|
| JP | 2012194970 A | 10/2012 |
| KR | 1020120045415 A | 5/2012 |

OTHER PUBLICATIONS

Communication Pursuant to Rules 70(2) and 70a(2) EPC for EP App No. 14827949.0 dated Jul. 7, 2017, 1 pg.

Extended European Search Report for EP App No. 14827949.0 dated Jun. 20, 2017, 8 pgs.

* cited by examiner

SYSTEMS AND METHODS FOR GUIDED USER ACTIONS ON A COMPUTING DEVICE

This application is a Continuation-in-Part of U.S. patent application Ser. No. 14/145,596, filed on Dec. 31, 2013, the content of which is incorporated herein in its entirety by reference.

BACKGROUND

Field

The subject matter discussed herein relates generally to data processing and, more particularly, to systems and methods for guided user actions.

Related Background

Users frequently create content, such as new photos, videos, and posts for sharing with family, friends, acquaintances, and other users. However, the sharing process can be cumbersome. For example, even if a user is on an email system or social network with groups or social circles of contacts already set up, the user must manually identify and select the user with whom he or she wants to share a particular photo, video, post, or other content.

For example, a person (e.g., Alice) is on a trip taking photos every day. Alice wants to share some of the photos with her family almost daily. Every time she shares photos with her family, Alice needs to select the photos to be shared, select a method of sharing (e.g., via email, social network, etc.), and select her family as the recipient.

SUMMARY

The subject matter includes a method for guided user actions, including gathering information associated with a first action performed by a user; applying machine learning to generate a predictive model and a privacy preference of the user, based on the information and a past sharing action associated with the information, wherein the machine learning is applied so as to receive the information and output the predictive model, and wherein at least one pipeline is provided for at least one respective domain, the at least one pipeline applying the machine learning; determining an applicability level of the predictive model to the first action, wherein the predictive model suggests a second action; providing the second action for the applicability level exceeding a first threshold level associated with a degree of sharing of content associated with the first action; receiving input associated with the user selecting the second action or a third action for the applicability level exceeding the first threshold level and not exceeding a second threshold level that exceeds the first threshold level; and for the applicability level exceeding the second threshold level, selecting the second action or the third action based on the provided second action without requiring the input associated with the user.

According to another example implementation, a computer-implemented method is provided that includes: gathering information associated with a first action performed by one or more users; applying machine learning to generate a predictive model associated with a privacy preference of the one or more users, based on the information and a past privacy action associated with the information, wherein the machine learning is applied so as to receive the information and provide the predictive model to an administrator; determining an applicability level of the predictive model to the first action, wherein the predictive model suggests a second action; providing the second action to the administrator for the applicability level exceeding a first threshold level associated with a degree of sharing of content associated with the first action; receiving input associated with the administrator selecting the second action or a third action for the applicability level exceeding the first threshold level and not exceeding a second threshold level that exceeds the first threshold level; and for the applicability level exceeding the second threshold level, selecting the second action or the third action based on the provided second action.

According to yet another example implementation, a computer-implemented method is provided that includes: gathering information associated with a detected first action; applying a predictive model to suggest a second action based on an application of machine learning to the first action and the information; calculating a first confidence level associated with the application of the machine learning to the first action and the information; for the first confidence level exceeding a threshold, providing the second action, and performing the second action or a third action based on user input.

The methods are implemented using one or more computing devices and/or systems. The methods may be stored in computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for guided user actions.

Figure 1:
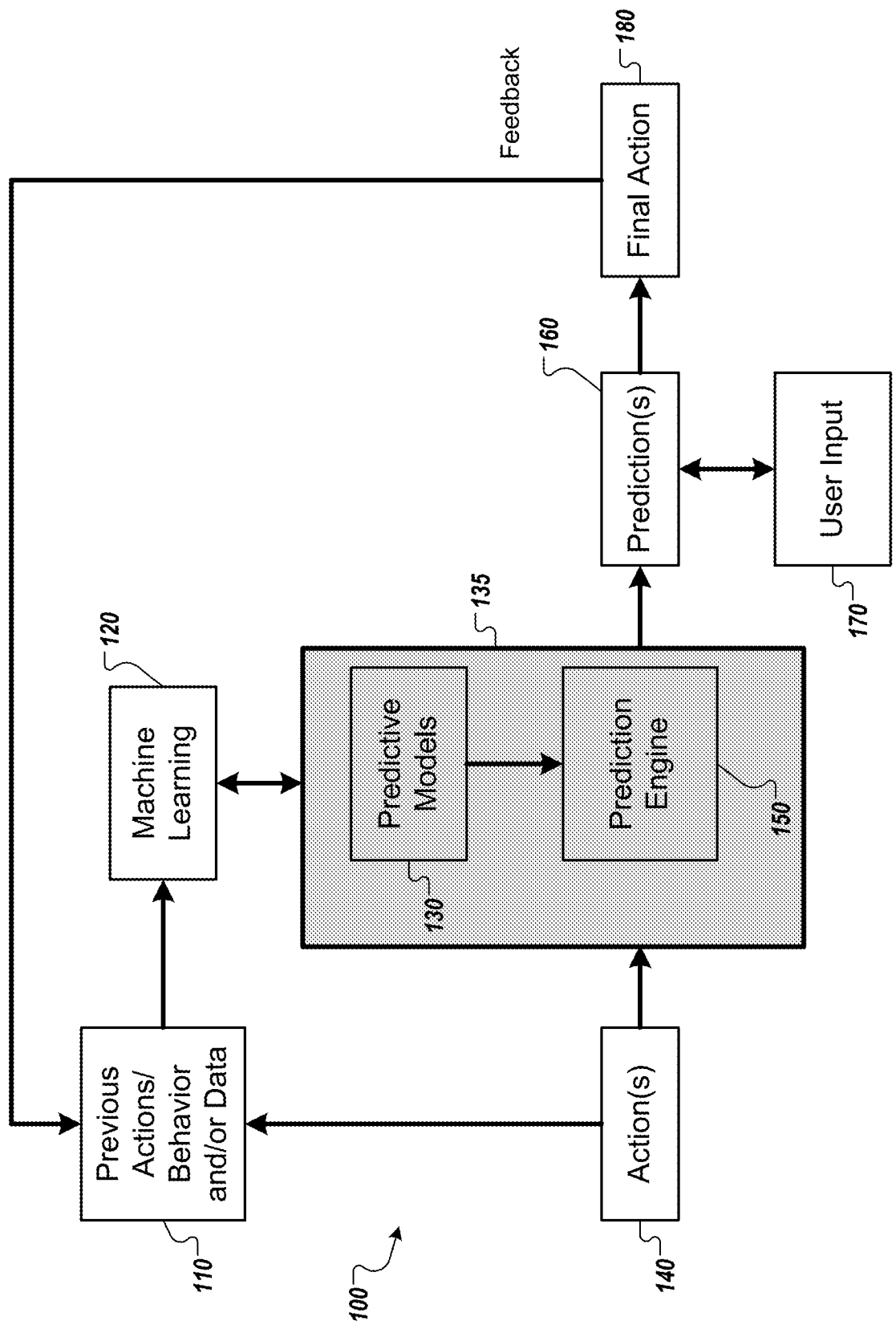
FIG. 1 shows a data flow diagram of an example system according to some implementations.

FIG. 1 shows a data flow diagram of an example system according to some example implementations. System 100 includes a model generation portion 110-130 and a model application portion 130-180. In some implementations, the model generation portion is 110-135, and the model application portion is 135-180, with the functions of predictive models 130 and prediction engine 150 combined into a prediction generator 135. The model generation portion includes, for example, using machine learning 120 to analyze previous actions of a user, the behavior and/or habits of the user, and data associated with the user (collectively referred to as user history 110), and to generate predictive models 130 associated with the user. For example, with the permission of the user, system 100 (e.g., machine learning 120) uses and analyzes past observations of sharing behavior (e.g., past sharing actions) by the user to generate one or more predictions (e.g., predictive models) of the desired audience associated with the user and/or desired sharing methods for new sharing actions by the user. History 110 can be the history of one or more applications, websites, services of different providers, etc. the user has given permissions or consents to gather the user's usage history and user actions. The model generation portion of system 100 is further described in FIG. 2A below.

Remaining in FIG. 1, in the model application portion of system 100, when the user attempts to share data (e.g., photo, video, etc.) or take one or more sharing actions 140, system 100 (e.g., prediction engine 150) identifies and uses one or more predictive models 130 based on actions 140 to provide the user with one or more predictions 160, which may include one or more action options, such as a sharing prediction (e.g., share with the user's family by email) and one or more other sharing options (e.g., share with the user's family by a user selected method; share with user selected recipients by a predicted method of sharing through the user's social network account; a third sharing option, etc.). Actions 140 become part of user history 110 if the user has given permissions to use actions 140.

The user may provide user input 170 via, for example, a user interface (not shown) to select or change one of the predictions 160 or action options. A user may select a sharing prediction predicted by the prediction engine 150. A user may change some part of the sharing prediction or select one of the other sharing options. The user's selection becomes the final action 180. In some implementations, the final action 180 (e.g., the user's selection) is provided as feedback to the history 110. The model application portion of system 100 is further described in FIG. 2B below.

Sharing content is used as an example to describe the subject matter herein. It should be noted that the subject matter herein applies to all user actions and is not limited to sharing content. For example, one of the user actions may be browsing on the Internet. Many browsers allow users to browse in a private browsing mode (e.g., incognito browsing in Chrome®, InPrivate browsing in Internet Explorer®, Private Browsing in Firefox™ and Safari®). The term "private browsing mode" is an example of a privacy mechanism, but the present example implementations are not limited thereto, and other privacy mechanisms may be substituted or used in conjunction with private browsing mode.

The model generation portion or system 100 may learn from a user's browsing habits and history to generate one or more predictive models. For example, the user may browse some kinds of websites (e.g., websites of schools, news organization, government, etc.) in open mode and other kinds of websites (e.g., websites relating to personal finance, health, online shopping, etc.) in private mode.

When the user starts browsing a website of a financial institution, system 100 may predict, based on one or more models, that the user may want to browse in private mode and provide the prediction in one of the options. The user may accept that prediction and start browsing in private mode. If the user starts browsing in another mode or changes any part of the prediction, feedback of the user's actions or selections is provided back to system 100 (e.g., history 110) to fine tune the system 100 (e.g., machine learning engine and/or models).

Figure 2A:
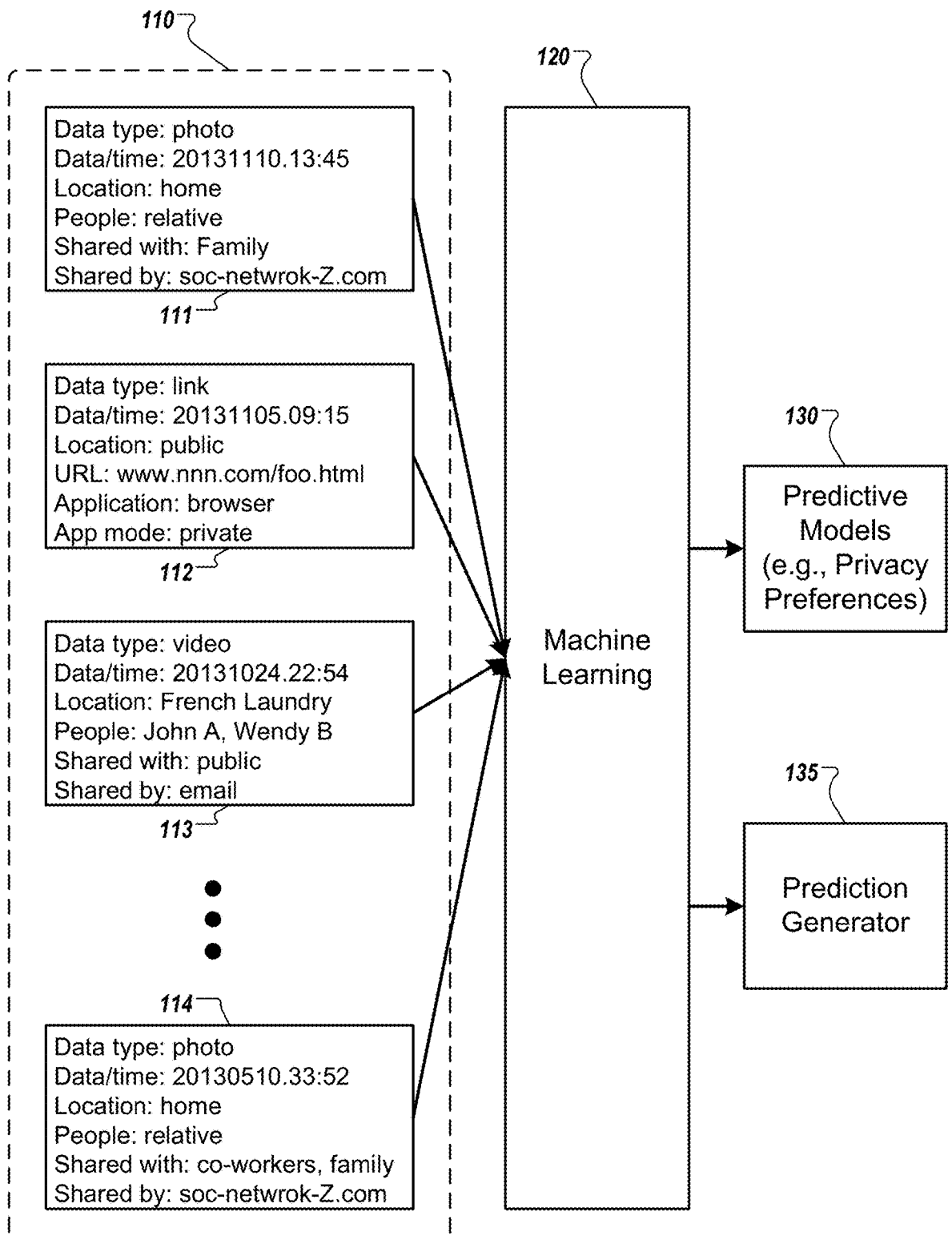
FIG. 2A shows a data flow diagram of an example implementation of predictive model generation.

FIG. 2A shows a data flow diagram of an example implementation of predictive model generation. User history 110 (e.g., previous actions, behavior, habits, data associated with a user) includes, for example, previous actions 111-114 provided to (e.g., read by) machine learning engine 120 to generate predictive models (e.g., privacy models or preferences) 130. In implementations with prediction generator 135, and with the authorization of the user, user history 110 is input to machine learning 120 to provide output to prediction generator 135. Prediction generator 135 may trigger machine learning 120 to process history 110 and/or provide the output to prediction generator 135. Previous actions 111-114 are represented by the information about content or action (IACA) of the previous actions.

As used herein, "information about content or action" or "IACA" is any information about content, any information about one or more actions taken in association with the content, or both. As used herein, "content" is any digital or digitized content. Content is any collection of information represented in digital form (i.e., represented in binary data). Examples of content include but are not limited to one or more files, documents, images, videos, audios, posts, communication messages (e.g., emails, short message texts, video messages, audio messages, etc., any combination thereof), games, any portion thereof, and any combination thereof.

As used herein, "information about content" is any information associating with the content. The information about content can be metadata, which includes but is not limited to application metadata (e.g., metadata defined in a language or a file format, such as HTML (HyperText Markup Language), JPEG (Joint Photographic Experts Group), etc.), descriptive metadata (e.g., description of a resource for identification and retrieval, such as file name, title, author, and abstract, etc.), structural metadata (e.g., relationships within and among objects, such as paragraphs, pages, chapters, etc.), administrative metadata (e.g., for managing resources, such as versioning, timestamps, access control, storage directories, or locations, etc.). This information is only used in the example implementation with the consent of the user.

In some example implementations, the information about content includes any data recorded or generated about the content. For example, the information may include a webpage (e.g., the uniform resource locator or URL of the webpage) visited by a user, the last webpage visited by the user (e.g., the referrer, in Hypertext Transfer Protocol or HTTP), the time when the webpage is visited, the location of the user when the webpage is visited, the mode of a tool, such as the private mode of a browser, the type of the webpage, whether the webpage requires authentication, etc.

The examples above regarding the webpage and other examples herein in connection with a user are described with the assumption that the implementations obtain the user's consent for recording the described information. If no consent is given by the user in connection with a piece of information, that piece of information is not recorded. In addition, a user may delete data in the user's history 110 or the entire history 110.

Other examples of data recorded or generated about the content include but are not limited to user-generated, device-generated, and application-generated information. For example, user-generated information includes information generated by any user or administrator. A user may provide description, feedback and/or comments about some content. An administrator may record an incident about some content. Device-generated information may include, for example, type of device, resources included in the device, applications used to open the content, states of the device, etc.

Application-generated information may include, for example, text information of an image. The application may be analyzing an image (e.g., pixel data, metadata, and/or vector data) and generate text information about the image. For an image of a picnic in the park, for example, the generated text data may include names or identities of the people in that picture or video (e.g., from facial recognition), description of the image (e.g., "picnic party in a park with trees and grass drinking sodas" from content analysis), and metadata (e.g., the image is taken by a certain model of camera, using a certain f-stop, in a certain image resolution, etc.).

In some example implementations, the information about content includes one or more fields of the content that is structured. For example, if the content is information stored in or retrieved from a database, any fields of the content can be used as information about content. If the content is an email message, and fields (e.g., To, From, Subject, CC, BCC, body, etc.) can be used as information about content.

As used herein, "information about one or more actions" taken in association with the content is any information associating with actions or information about actions. Information about actions includes but is not limited to history usage information (e.g., usage records or usage logs), information about the network, system, devices, operating systems, applications, modules, software, etc. used to perform the actions, information about the environment, date, time, location when the actions are performed, and other available information (e.g., recipient information, languages of the application used to perform the actions, etc.). The information about actions can overlap the information about content in some implementations. For example, whenever a user sets sharing permissions on some content (e.g., a photo, video, post, link), the user's permissions are associated with the content (e.g., stored the permissions as metadata). In some implementations, a user's environment may be recorded with consent given by the user. For example, identities of other known users in the vicinity (by tracking their devices or locations) of the user.

Referring to FIG. 2A, previous actions (e.g., actions 111-114) include, for example, the information about content or action (IACA) as shown in Table 1.

TABLE 1

|   | IACA | Action 111 | Action 112 | Action 113 | Action 114 |
|---|------|------------|------------|------------|------------|
| 1 | Data type | Photo | Link | Video | Photo |
| 2 | Date/Time | 20131110.13:45 | 20131105.09:15 | 20131024.22:54 | 20130510.33:52 |
| 3 | Location | Home | Public | French Laundry | Home |
| 4 | Target | Relative | www.nnn.com/foo.html | John A, Wendy B | Relative |
| 5 | Shared with | Family | — | Public | Co-worker, Family |
| 6 | Application | Soc-network-Z.com | Browser | Email | Soc-network-Z.com |
| 7 | Action | Shared | Browsed privately | Shared | Shared |

Table 1 shows an implementation that considers, for example, eight pieces or fields of IACA (rows 1-7). An implementation can consider any IACA information (e.g., any fields and any number of fields). The fields can be different based on content. For example, action 112 includes an URL as a target and a browsed privately action for the data type of a link (e.g., a reference) that are not included or used in actions 111, 113, and 114 with data types of photo and video.

The IACA information shown in actions 111-114 are only examples of IACA. There may be different and/or other IACA fields. For example, there may be an IACA device field (not shown) for providing device information, such as a phone, tablet, laptop, or another device.

Even for a given IACA field, such as the location field, the may be different or other information. For example, for the location field, there may be different or other kinds of location information, such as latitude and longitude, inside or outside of a certain thing (e.g., building), in a private space or public space. There may be different ways of capturing relevant "location" information that can be independent of on another (e.g., can be implemented to any combination or all of location information for using in generating the predictive models 130).

The machine learning 120, which can be a system, a device, an application, or a software module, may be implemented as a black box to process user history 110 to produce predictions or predictive models 130. Machine learning 120 may be implemented in any way to execute instructions of any one or more algorithms. One of the algorithms, for example, may be processing user history 110 (e.g., actions 111-114) to generating "shared with" and/or "shared by" models 130 with a threshold of, for example 50% (e.g., generate a model if the threshold of 50% or above is met).

After actions 111-114 are processed, machine learning 120 generates, for example, the example models shown in Table 2 for predicting who to share content with and/or how to share the content by based on one or more attributes of the content.

TABLE 2

| Conditions | Shared with | Shared by/application | Mode |
| --- | --- | --- | --- |
| M1 Data type = Photo, or Location = Home, or People = Relative | Family (100%), Co-workers (50%) | Soc-network-Z.com (100%) | — |
| M2 Data type = Link, or Location = Public, or URL = www.nnn.com | — | Browser (100%) | Private (100%) |
| M3 Data type = video, or Location = French Laundry, or People = John A, Wendy B | Public (100%) | Email (100%) | — |

Table 2 shows that, for example, three models or predictive models 130 M1-M3 are generated from history 110 (e.g., actions 111-114). For clarity in illustration, four actions 111-114 are shown and described. M1 may be generated using the IACA of actions 111 and 114. M2 and M3 each may be generated using the IACA of only one action, 112 or 113, respectively. In some implementations, a model is generated only if the data set that supports the model (i.e., the IACA used to generate the model) is of a certain sample size. For example, in the example of Table 2, if there is a data set size or sample size requirement of 2, models M2 and M3 will not be generated due to insufficient of data set of 1. Model M1 will still be generated due to the data set size of 2 (actions 111 and 114). In some implementations, predictive strength may be estimated based on sample size. Predictive strength may also be estimated by one or more algorithm used by system 100.

The models M1-M3 as well as other models described herein are only examples. In actual implementation, there may be different and/or other models. In addition, different models may be combined into fewer models. Yet in other implementations, models are conceptual models or dynamic models generated on the fly.

As described above, machine learning 120 may be implemented as a black box that provides one or more predictions based on user history 110. One or more of any number of algorithms may be dynamically applied in this black box. What is common is that data 110 (FIG. 2A) goes in and models 130 come out (FIG. 2A). In some implementations, instead of or in addition to models 130, machine learning 120 produces output for prediction generator 135 to generate one or more predictions. For example, in some implementations, none of models M1-M3 may be generated. For example, system 100 (FIG. 1) may be implemented with different pipelines or processes for different domains. One process pipeline may be for browsing (e.g., using one or more browsers); another pipeline may be sharing on a social network; a third pipeline may be relating to email communication; one or more pipelines may be based on content type (e.g., a pipeline for photos, one pipeline for audio and/or video, etc.).

For example, sharing photos, the machine learning algorithm will determine internally what is relevant based on the history data 110 it receives, and provide output to prediction generator 135 to produce the predictions. Similarly, for other processing domains, such as browsing, a different machine learning algorithm will determine internally what is the relevant browser setting to use based on the history data 110 machine learning 120 processes.

In actual implementations, history 110 contains information of a much bigger set of usage history and/or user actions. History 110 is likely to grow over time and the amount of information about content or action (IACA) associated history 110 also grows larger. A bigger data set, in general, leads to more accurate models being generated.

In implementations that include a data set size, when the data set is sufficiently large (e.g., at least the required data set size), the system can start to make user action predictions based on previous actions (e.g., generating and applying predictive models based on history 110).

As another example, with a user Alice, if 100 of Alice's photos contain Alice's relative, Alice may have shared 90 of the 100 photos with Alice's "family" online social circle (e.g., one or more contacts put in a group with a label "family"), and shared 10 of the 100 photos with Alice's "co-worker" online social circle. The system, as authorized by Alice, determines or "learns" that Alice tends to share photos of Alice's relative with Alice's "family" online social circle (e.g., machine learning 120 generates a model M4 based on that learning). If Alice has taken 50 photos at home, Alice may have shared 45 of the 50 photos with Alice's "family" online social circle, and 5 of the 50 photos with Alice's "extended friends" online social circle. The system learns that Alice tends to share photos taken at home with Alice's "family" online social circle (e.g., machine learning 120 generates a model M5 based on that learning). The result is that in aggregate Alice has a multi-dimensional model (e.g., M4 and M5) that is able to associate different kinds of IACA (e.g., location, time of day, identities of people, etc.) with different sharing preferences.

In some implementations, predictive models 130 may be generated based on privacy preferences of a user. These predictive models or privacy preferences models can be used to make predictions of desired privacy sharing settings or preferences. For example, Alice takes a picture of Alice's relative at 3:30 PM in the park and wants to share that (the 3:30 picture). The system analyzes past sharing actions (e.g., history 110) with similar IACA. The system learns that and creates one or more models to the effect of Alice tends to share pictures and videos of Alice's relative with the "family" online social circle (model M6), except when the pictures and videos are taken in public, in which case Alice shares with "extended friends" (model M7). Media (e.g., pictures and videos) captured in the afternoon tends to be shared more widely (model M8). In the example of the 3:30 picture, the privacy preferences models M6 and M7 or M8 lead to a prediction that Alice would want to share the 3:30 picture of her relative with her "family" (M6) and "extended friends" (M7, park=in public, or M8, 3:30 PM=afternoon) online social circles since the picture was captured in a public place during the day. All of the foregoing is performed with the consent of the user.

Depending on implementations, different algorithms can be used to generate models 130, which may be based on privacy preferences of a user. For example, the machine learning black box of "data in, predictions out" can function in many different ways using different algorithms. The algorithms that produce the most accurate predictions (e.g., based on final actions) may be retained or floated to the top of an algorithm application priority queue. The user can decide at any point whether or not to set their privacy preference (e.g., consent) so as to participate in this example implementation.

Figure 2B:
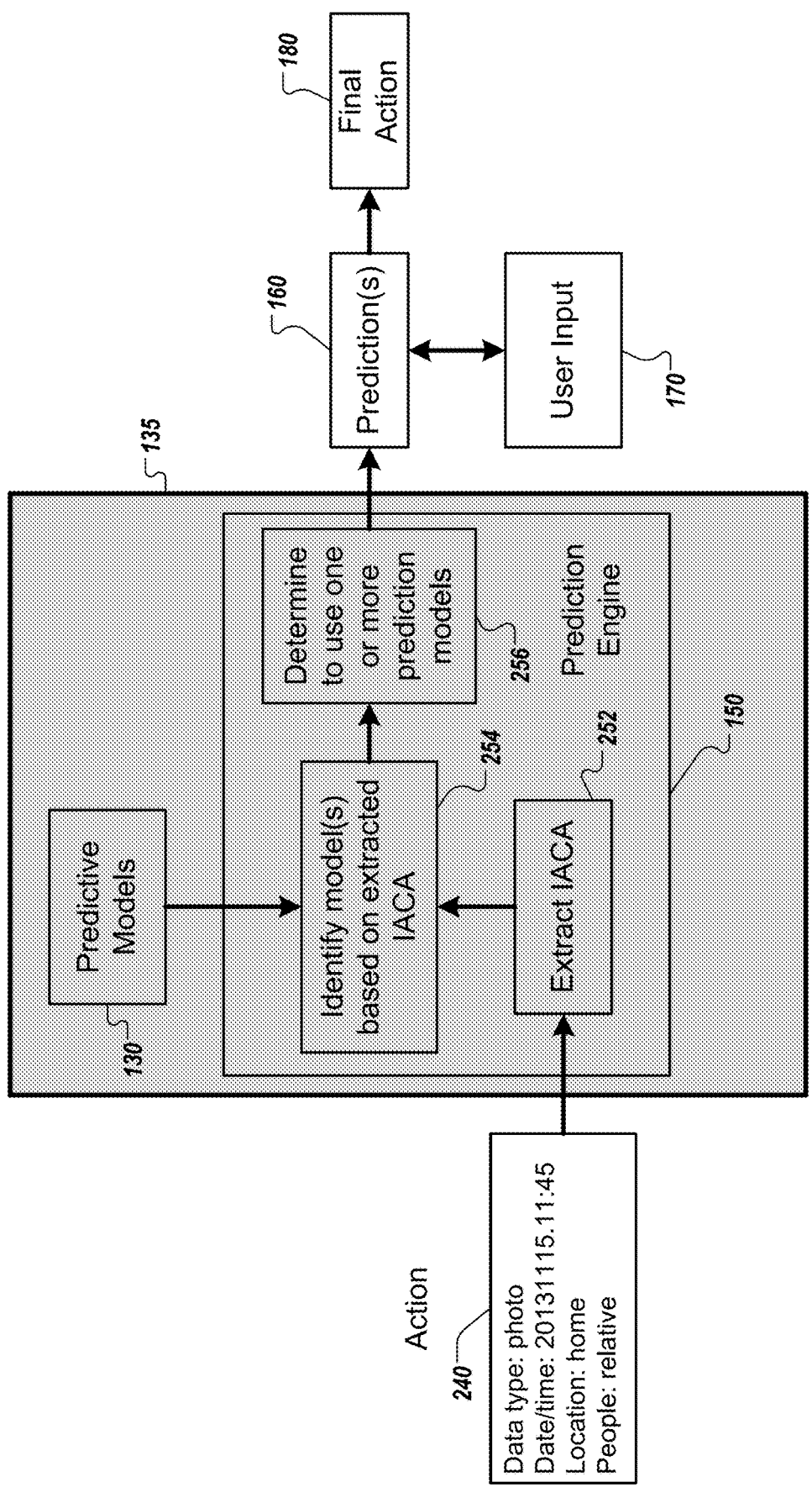
FIG. 2B shows a data flow diagram of example implementations of user action predictions.

FIG. 2B shows a data flow diagram of example implementations of user action predictions. A user (e.g., Alice) may have selected a photo as action 240. In some implementations, taking or saving a photo may be considered as action 240, which triggers the process of prediction generator 135 or prediction engine 150.

If prediction engine 150 is implemented, at block 252, IACA associated with action 240 and/or the corresponding photo (e.g., content) is extracted. Some example fields of the extracted IACA may include a data type of photo, a timestamp, a location of home, and an identification of a person on the photo being the relative. At block 254, one or more models are identified or selected based on the extracted IACA. For example, model M1 shown in Table 2, may be identified based on the data type of photo, the location of home, and/or the people being a family member (e.g., relative being the family member in this example implementation).

In some implementations, one or more models may be identified based on actions or potential actions, such as social network sharing, emailing, browsing, etc. In some implementations, models may be selected based on both actions and data type, such as sharing photos on a social network, sharing audio content on a social network, etc.

If more than one model is identified at 254, as in the case of the 3:30 picture above with models M6-M8, a determination is made at block 256 to use one or more of the identified models. One example implementation of block 256 may involve assigning weights to one or more pieces or fields of the extracted IACA. For example, data type can be assigned a weight of X; location, a weight of Y, and people, a weight of Z. If each of X, Y, Z is enough to meet a threshold level, then a model with the highest weight is chosen. If it takes the combination of two or more weights X, Y, and Z to meet the threshold level, then the models that contribute to the sum of weights that meet the threshold level are chosen. If more than one prediction can be predicted from the chosen models, the predictions may be presented to the user in order of decreasing weights or sums of weights, as shown in screenshot 300B, FIG. 3, which is described below. In some implementations, the determination is done not using weights but using different factors, which can be any factors.

If prediction generator 135 is implemented, prediction generator 135 may process existing output from machine learning 120 (FIG. 1) or may request machine learning 120 to provide output on demand or on an as needed basis. For example, prediction generator 135 may process actions 140 as described in box 252. Instead of box 254, prediction generator 135 may request machine learning 120 to generate output from history 110 based on IACA of actions 140. If more than one prediction is generated, the predictions may be prioritized, ranked, or reduced. Machine learning 120 and prediction generator 135 may function as a black box predictive engine that continue to grow based on history 110 and feedback from final action 180. In some implementations, both 135 and 150 may be implemented with different pipelines or processes for different domains. For example, prediction generator 135 may be implemented in the domain of sharing photos, and prediction engine 150 may be implemented in the domain of browsing the Internet.

At block 160, one or more predictions may be presented to the user (e.g., Alice). In some implementations, a user may decide (e.g., through configuration or setting) that if one of the predictions meets a certain level (e.g., has a weight or sum of weights of 80% or 90%), that prediction may be automatically selected and used without the input of a consenting user (e.g., automatically shares the 3:30 picture to Alice's "family" online social circle without presenting the predictions Alice for selection, although Alice has previously consented to use of the system). If one or more predictions are presented to the user at 160, the user may provide input 170 using a user interface (not shown) to identify or select one of the predictions. The user may also provide input (e.g., who to share content with and/or how to share the content by, etc.) that is not in any of the predictions. The user's input may be provided as feedback to, for example history 110 in FIG. 1. Machine learning 120 may incorporate or account for the user's feedback in generating models and/or to changes one or more models already generated. In some implementations, predictive models 130 may be managed by a manager that changes or deletes one or more models based on the user feedback.

As with the foregoing example implementations, the user remains in control of whether this feature is used (e.g., consent), and can at any time decide to not use this feature.

At block 180, the final action is taken, such as sharing the 3:30 picture to Alice's "family" online social circle on a social network, sending a document by email to the identified recipients, switching or using the private mode of a browser to visit a website, etc.

Figure 3:
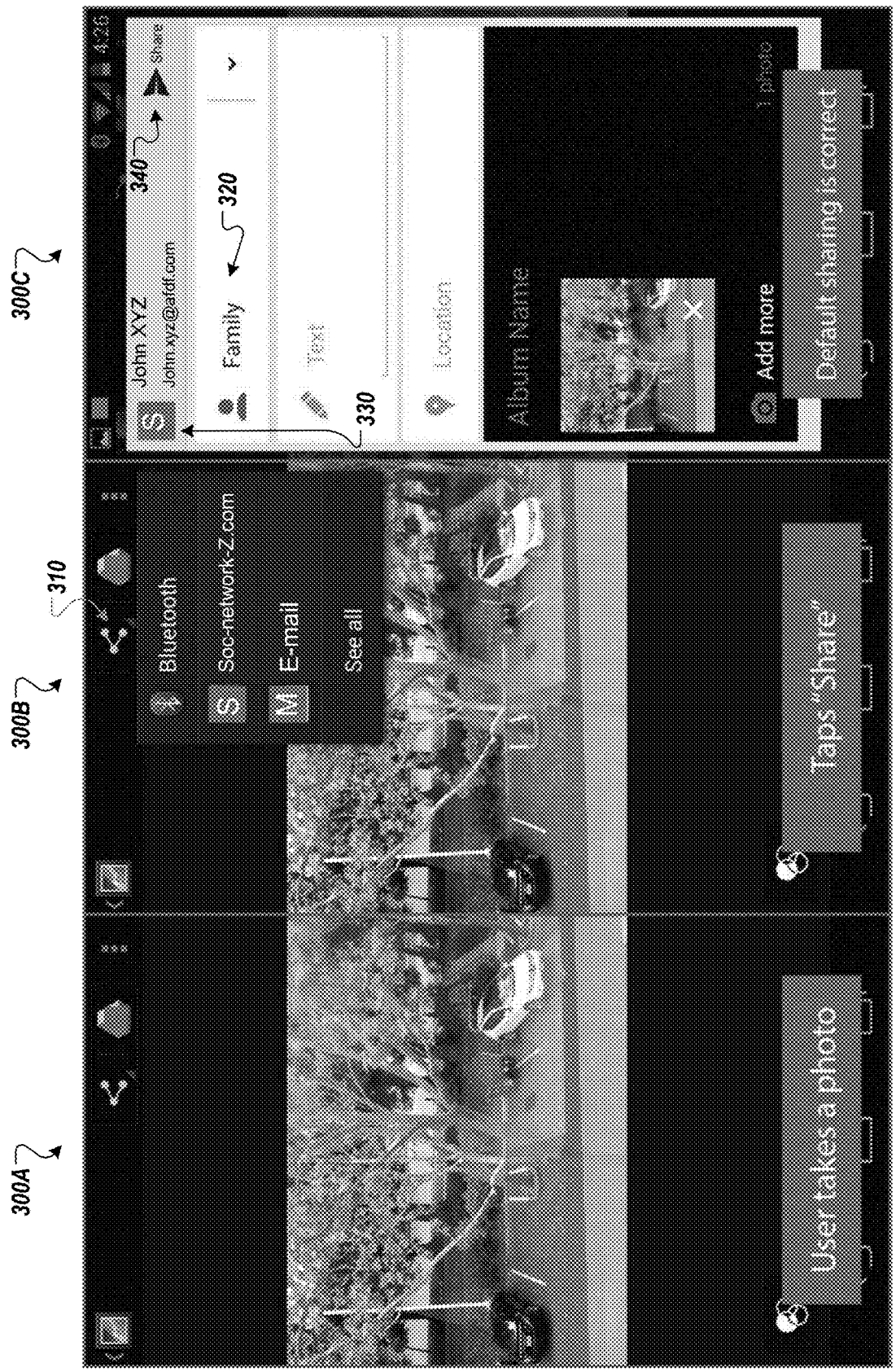
FIG. 3 shows example user interfaces according to some example implementations.

FIG. 3 shows example user interfaces according to some example implementations. The user interface here is described using screenshots 300A-300C of a mobile device. In screenshot 300A, a user takes an action (240, FIG. 2B), which may be taking a photo, saving a photo, or selecting a photo. In some implementations, as shown in screenshot 300B, action 240 is mapped to a more certain intention of the user, such as the user tapping the "Share" button 310. Next, the process of the prediction engine (e.g., blocks 252-256) is executed to arrive at one or more predictions 160, as described in FIG. 2B. In FIG. 3, predictions 160 are shown in screenshots 300B and 300C. Screenshot 300B shows the "shared by" predictions and screenshots 300C shows the "shared with" predictions, which may be based on the user's selections of the "shared by" predictions in screenshot 300B.

The example "shared by" predictions in screenshot 300B are "Bluetooth," "Soc-network-Z.com," "E-mail," and others, which are hidden in the "See all" submenu. The "shared by" predictions may be presented in the order of highest to lowest of predictions certainties or weight scores. For example "Bluetooth," may have a score of 90%, "Soc-network-Z.com" may have a score of 88%, and "E-mail" may have a score of 65%. Other predictions meeting the minimal requirement threshold (e.g., 50%) may be hidden in the "See all" submenu.

In screenshot 300B, for example, the user provides input to select the "Soc-network-Z.com" option, which may be provided as a feedback back to the system as described above. The user's selection leads to screenshot 300C, where the "shared with" predictions may be presented to the user. Share by Soc-network-Z.com 330 is shown, and the user in this example is John XYZ. One prediction is shown predicting that John XYZ would want to share the photo with his "Family" online social circle 320. John can enter more recipients and/or replace the "Family" online social circle, which may be provided as a feedback back to the system as described above. As disclosed above, the example implementation is only performed with the consent of the user, in this case John XYZ.

In screenshot 300C, the prediction of sharing with John's "Family" online social circle is a correct default prediction based on John not changing the prediction. When John presses the "Share" button or widget 340, the photo taken in screenshot 300A is shared with John's "Family" online social circle on Soc-network-Z.com.

In some implementations, the "shared by" predictions and the "shared with" predictions may be presented together in one user interface or screen. For example, in screenshot 300B, next to each "shared by" options may be one or more "shared with" options.

Depending on implementations, different devices or different applications of one device can make use of predictions in different ways. For example, a camera application can pre-populate one or more sharing settings with predicted privacy preferences (e.g., "family" online social circle). In some implementations, predictions or privacy preference may offered as shortcuts and or suggestions (e.g., in addition one or more default settings or predictions), which allow the user to access with a single tap or click. In all example implementations, the user may decide to not participate or consent.

In some implementations, user action prediction may be implemented to apply to batch sharing (e.g., sharing or emailing of media). For example, if Alice takes 10 photos of Alice's relative, then takes 5 photos of a co-worker, then takes 10 more photos of Alice's relative, an implementation of user action prediction may prompt Alice to first share all 20 photos of Alice's relative with Alice's "family" online social circle on a social network, and then prompt Alice to send the 5 photos of Alice's co-worker by email to Alice's team at work (using one or more email addresses). In all example implementations, the user remains in control of participation, and may decide to consent or not consent at any time.

As described above, user action prediction can be implemented to apply to any content, using any application, and in connection with any user action. For example, privacy preferences models based on Alice's browsing may be generated based on Alice's browsing habits and history. The models may be used every time Alice is browsing. One model may indicate that when Alice browsed some kinds of websites (e.g., health information websites) she tends to browse in private mode of the browser. Applying the model, whenever Alice starts browsing a kind of website that Alice typically browses in private mode (and Alice is not browsing in that mode), the browser may either suggest to Alice to use the private mode or automatically enable the private mode, based on Alice's configuration or settings on the browser. As noted above, Alice may decide to consent or not consent.

Figure 4:
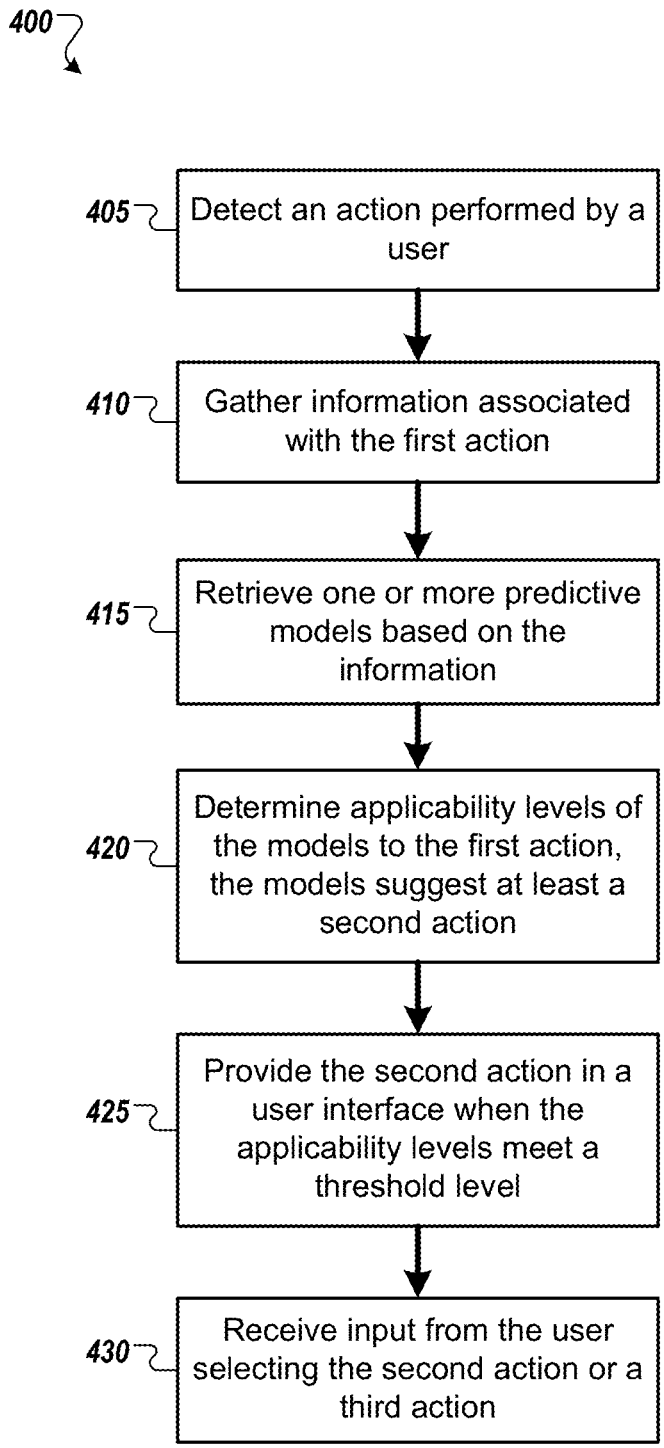
FIG. 4 shows an example of a process implementation.

FIG. 4 shows an example of a process implementation. Process 400 may be implementing the operations of FIG. 2B and/or described in FIG. 3. At block 405, an action performed by a user (e.g., action 240) is detected. At 410, information (e.g., IACA) associated with the first action and/or the content in connection with the first action is gathered, collected, identified, or extracted. At 415, one or more predictive models based on the information collected at 410 are identified, selected, or retrieved. At 420, applicability levels of the predictive models to the first action are determined, for example, using weights as described in block 256, FIG. 2B. Each predictive model suggests or predicts at least a predicted action (e.g., an action of selecting who to share content with and/or an action of selecting how the content is shared by, such as using what application to share the content).

At 425, one or more predicted actions from the models, determined to be used based on the applicability levels meeting a threshold level, are provided or presented in a user interface. At 430, input from a user is received selecting one predicted action or another predicted action (or modifying a predicted action or providing an action not predicted). The action selected in 430 is performed. The user's selection or input may be provided as feedback to the system, for example, to improve the system (e.g., accuracy, performance, predictions, etc.).

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 5:
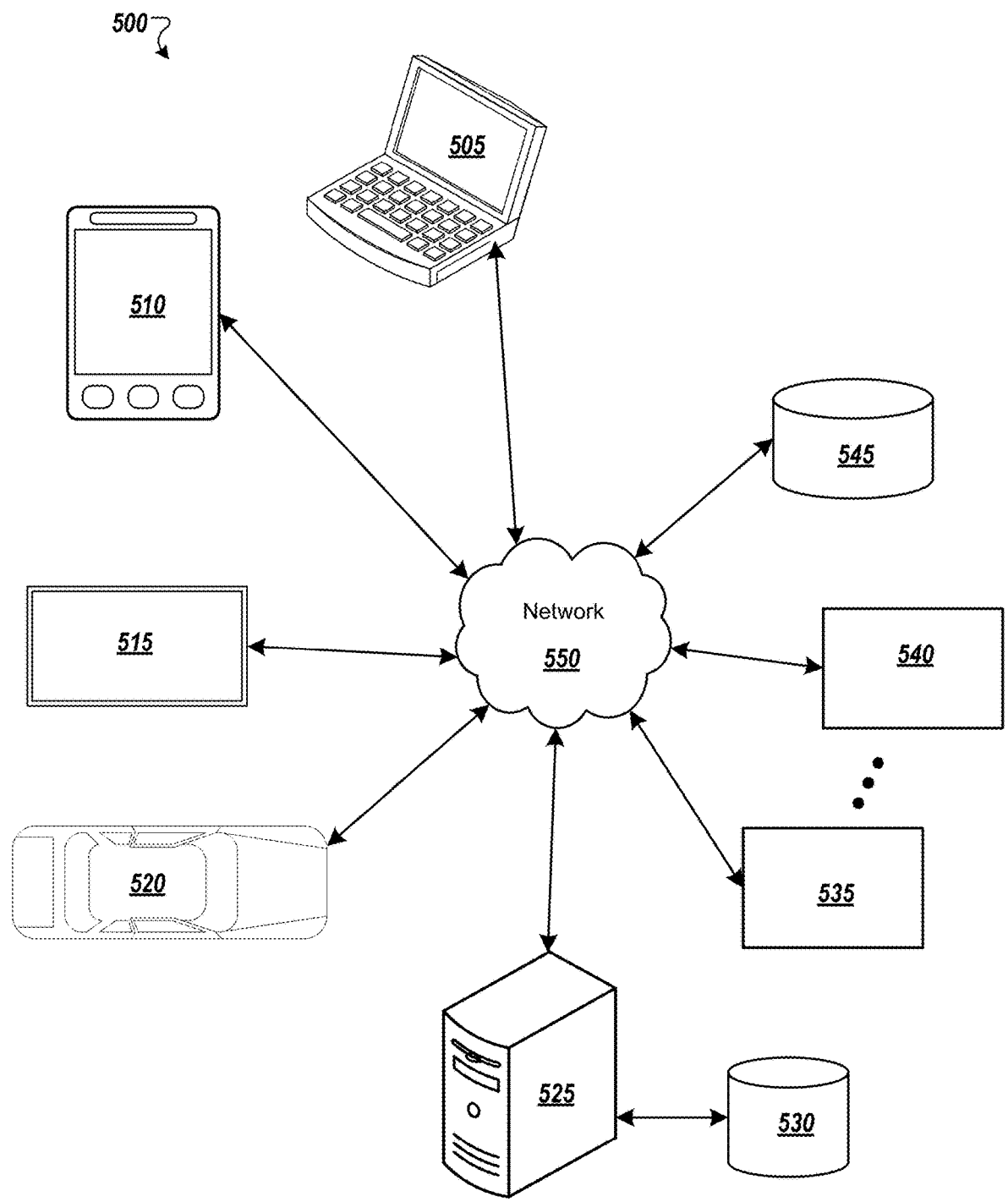
FIG. 5 shows an example environment suitable for some example implementations.

FIG. 5 shows an example environment suitable for some example implementations. Environment 500 includes devices 505-545, and each is communicatively connected to at least one other device via, for example, network 560 (e.g., by wired and/or wireless connections). Some devices may be communicatively connected to one or more storage devices 530 and 545.

An example of one or more devices 505-545 may be computing device 605 described below in FIG. 6. Devices 505-545 may include, but are not limited to, a computer 505 (e.g., a laptop computing device), a mobile device 510 (e.g., smartphone or tablet), a television 515, a device associated with a vehicle 520, a server computer 525, computing devices 535-540, storage devices 530 and 545.

In some implementations, devices 505-520 may be considered user devices, such as devices used by users to create content and/or issue requests, such as sharing content on a social network. Devices 525-545 may be devices associated with service providers (e.g., used by service providers to provide services and/or store data, such as webpages, text, text portions, images, image portions, audios, audio segments, videos, video segments, and/or information thereabout).

For example, a user (e.g., Alice) may access, view, and/or share content or a photo using user device 510 on a social network supported by one or more devices 525-545. Device 510 may be running an application that implements guided user actions or user action prediction. After Alice takes a photo with device 510, as shown in FIG. 3, Alice taps the "Share" button 310. The application that implements guided user actions used models generated based on Alice's history data to provide one or more predictions, as shown in screenshots 300B-C. Alice taps the "Share" button 340 to accept the default or predicted sharing action, which may include who to share the photo with and how to share the photo by (e.g., using what application or service to share the photo).

Figure 6:
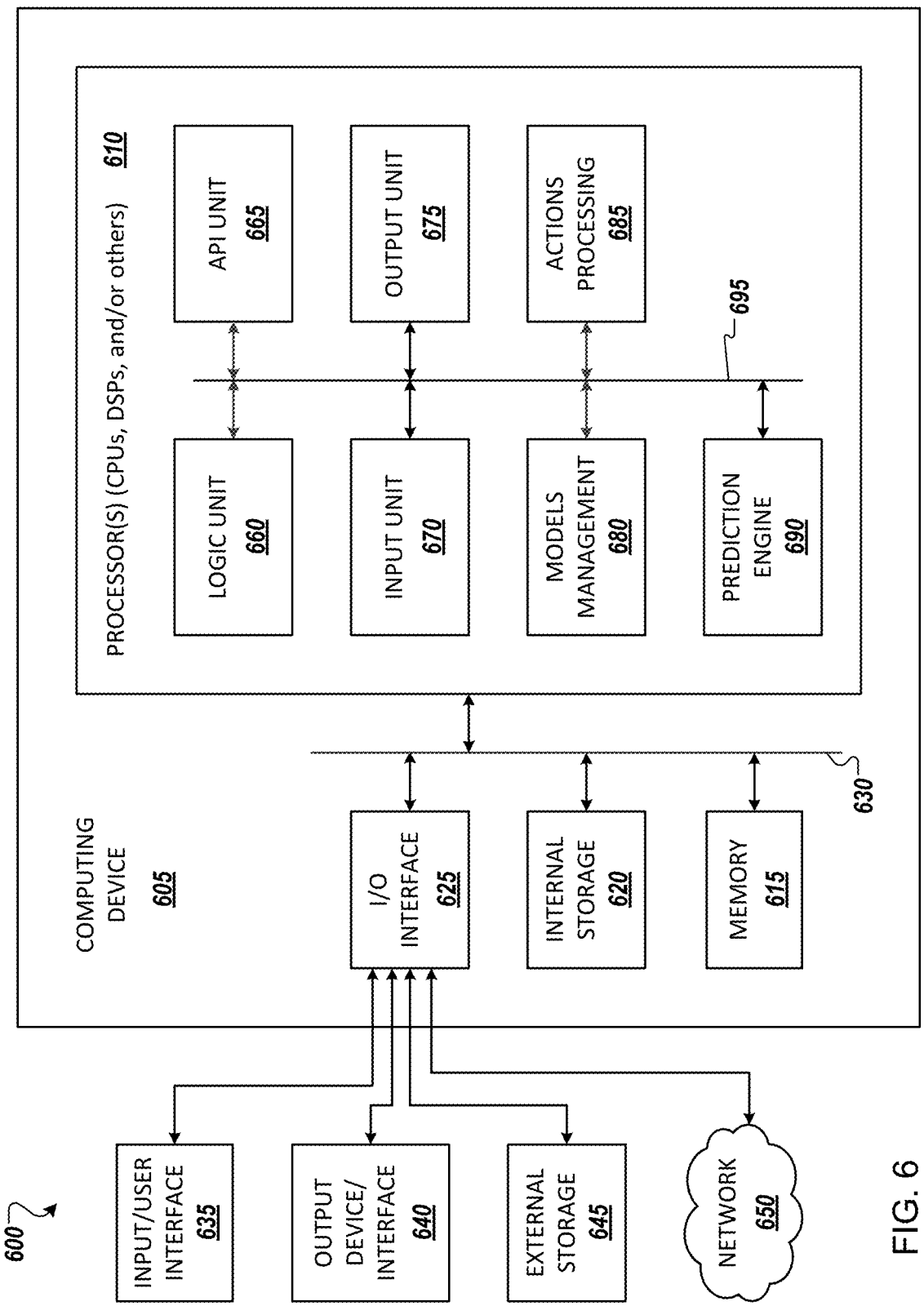
FIG. 6 shows an example computing environment with an example computing device suitable for use in some example implementations.

FIG. 6 shows an example computing environment with an example computing device suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, models management 680, actions processing 685, prediction engine 690, and inter-unit communication mechanism 695 for the different units to communicate with each other, with the OS, and with other applications (not shown). For example, models management 680, actions processing 685, and prediction engine 690 may implement one or more processes described and shown in FIGS. 1-5 above and FIGS. 7-12 below. The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675, models management 680, actions processing 685, and prediction engine 690). For example, after input unit 670 has detected a user action, prediction engine 690 process that action and interfaces with models management 680 to retrieve one or more predictive models to provide one or more predicted actions. The models may be generated by actions processing 685 based on previous actions or user history. Input unit 670 may then provide input from a user selecting or modifying one of the predicted actions. Output unit 675 then performs the final action based on the user's input.

In some instances, logic unit 660 may be configured to control the information flow among the units and direct the services provided by API unit 665, input unit 670, output unit 675, models management 680, actions processing 685, and prediction engine 690 in some example implementations described above. For example, the flow of one or more processes or implementations may be controlled by logic unit 660 alone or in conjunction with API unit 665.

The foregoing example implementations may be applied not only to individual users. Additionally, the model may be applied at an organizational level. For example, but not by way of limitation, the organization may include but is not limited to an enterprise including one or more users and an administrator setting and implementing the usage policy for the one or more users. More specifically, the machine learning approach as disclosed in the forgoing amendments may be applied to assist the administrator in implementing the usage policy.

For example, a user may access online information by use of a browser. The user may provide an input to access a site, such as by entering a URL or selecting a link. When the user provides the input and accesses the site, the machine learning engine may receive an input, which may include, but is not limited to, information such as time of access, length of access, device from which access occurs, or other information associated with the user accessing the site, such as information associated with the demographics, behavior, and/or actions of the user, as explained in greater detail below. The machine learning engine, based on the received information, may suggest to the user to switch to a privacy mode. For example, the machine learning engine may recommend for the user to browse in private browsing mode.

For example, the machine learning engine may consider the context of usage in determining whether to recommend private browsing mode. If the user is shopping for a certain type of good or service, the user may consider this context, as well as the timing, length of browsing, device from which the shopping is performed, to determine whether or not to recommend private browsing mode.

Similarly, the machine learning engine may operate in the content sharing context. For example, a user may attempt to share a photo of his or her child. The machine learning engine, with the permission of the user, may learn, based on the context information associated with the activity of taking the photo, or the content of the photo itself, that the photo was taken during the day at a park. Based on this information, the machine learning engine may recommend a recipient for the photo, such as a spouse.

In another example, the user may be accessing content having an IP address. The IP address of the content may be considered to be a context aware basis for suggesting sharing of the content. If a user is accessing news about a certain region, the machine learning engine may recommend sharing the news with other users in the social network of the user, based on similar interests or usage patterns of the other users, as well as past sharing habits of the user.

For example, an organization may be conducting market intelligence or competitive analysis associated with a particular site, and may not want that site to be able to detect an identity or location of the users who are accessing that site; for example, for example, geolocation lookups can be performed on an IP address. Accordingly, the administrator may provide a list of domains or paths that will automatically switch a user's domain to private browsing mode. End-users may be provided with an option to override the automatic switching to private browsing mode. Alternatively, the administrator made determined that the end user may default to private browsing mode, and instead provide a list of domains or paths that will automatically switch the user's domain from private browsing mode to open browsing mode.

Figure 7:
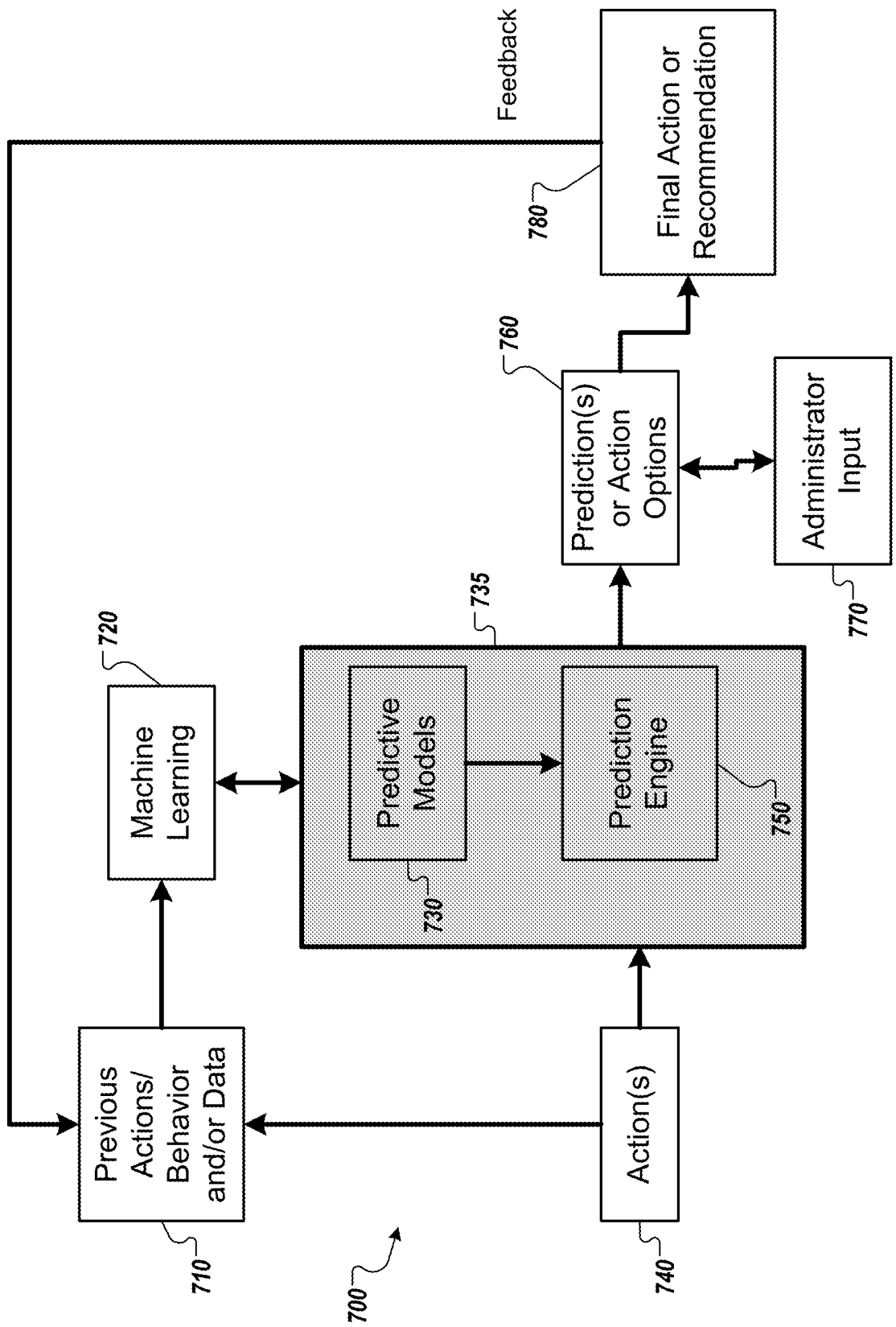
FIG. 7 shows a data flow diagram according to another example implementation.

FIG. 7 shows a data flow diagram of an example system according to some example implementations. System 700 includes a model generation portion 710-730 and a model application portion 730-780. In some implementations, the model generation portion is 710-735, and the model application portion is 735-780, with the functions of predictive models 730 and prediction engine 750 combined into a prediction generator 735.

The model generation portion includes, for example, using machine learning 720 to analyze previous actions, the behavior and/or habits of the user, and data associated with of one or more users in the enterprise (collectively referred to as organization history 710), and to generate predictive models 130 associated with the one or more users, which is provided to the administrator. For example, in accordance with the policy of the enterprise and as required by the administrator, system 700 (e.g., machine learning 720) uses and analyzes past observations of content sharing behavior (e.g., past privacy actions, including but not limited to sharing actions) by the one or more users of the organization or enterprise, to generate one or more predictions (e.g., predictive models) associated with the interactions between the users of the enterprise and external users for new sharing actions by the one or more users. As with FIG. 1 above, history 710 can be the history of one or more applications, websites, services of different providers, etc. for which the administrator of the organization is gathering the user's usage history and user actions.

In FIG. 7, in the model application portion of system 700, when the user attempts to share data (e.g., photo, video, etc.) or take one or more sharing actions 740, system 700 (e.g., prediction engine 750) identifies and uses one or more predictive models 730 based on actions 740 to provide the user with one or more predictions 760, which may include the one or more action options or recommendations to the administrator, as explained above (e.g., switch to private browsing mode). Actions 740 may become part of user history 710.

The administrator may provide user input 770 via, for example, a user interface (not shown) to select or change one of the predictions 760 or action options. An administrator may select a sharing prediction predicted by the prediction engine 750. The administrator may change some part of the sharing prediction or select one of the other sharing options. The administrator's selection becomes the final action 780. In some example implementations, the final action 780 (e.g., the user's selection) is provided as feedback to the history 710.

Sharing content is used as an example to describe the subject matter herein. It should be noted that the subject matter herein may apply to all user actions for the organization, and is not limited to sharing content. For example, and as explained above, one of the user actions may include browsing on the Internet. Many browsers allow users to browse in a private browsing mode.

The model generation portion or system 700 may learn from a browsing habits and history of the users in the organization to generate one or more predictive models. For example, an organization may be doing a research project on a competitor. For example, the research project may cause a surge in traffic from the organization to the site of the competitor. The administrator may be provided with information indicative of the surge in traffic. The administrator may wish to provide one or more privacy mechanisms to protect various aspects of privacy, such as past history of the browser, or source IP of the browser. For example, if the administrator is aware of the research project, the administrator may automatically switch the users involved in the research project to private browsing mode when they access domains or paths associated with the competitor. The switching may be done based on the users in a particular part of the organization, or whether the user is working on that project.

As the machine learning engine develops further information on the traffic between the organization and the competitor, the machine learning engine may provide recommendations to the administrator with respect to the policy itself, or the implementation of the policy. For example, the machine learning engine may employ a clustering technique that takes into account surges in traffic, length of usage, volume of data or other information to determine that there is a situation the administrator should be aware of, and provide the administrator with a recommendation regarding the policy. In one example implementation, the machine learning engine determines a baseline for traffic between the organization and an external site.

The machine learning engine may determine that if the traffic increases by a certain amount or percentage within a prescribed time, then that the traffic is deemed to be unusual. If the traffic is deemed to be unusual by the machine learning engine, then the machine learning engine may provide the administrator with a recommendation that users should be automatically switch to private browsing mode. Another example implementation, the administrator may set the machine learning engine to automatically switch the user or users to private browsing mode without requiring the administrator to take an action. In other words, instead of making a recommendation, the machine learning engine may take an action and report the action taken to the administrator. According to the example implementation, the administrator may control the determination to switch to and from the private browsing mode via an interface.

Figure 8:
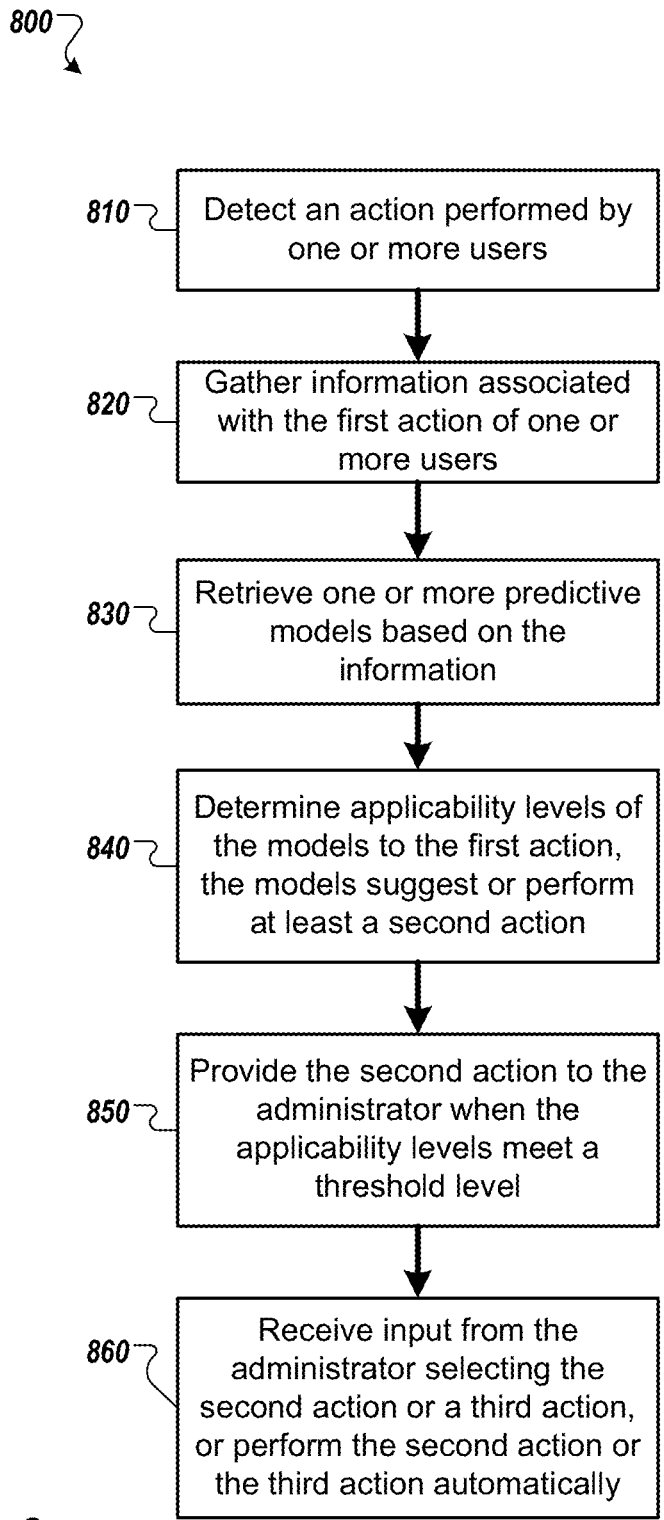
FIG. 8 shows an example of a process according to another example implementation.

FIG. 8 shows an example of a process implementation. At block 805, an action performed by one or more users in the organization is detected. These actions may include, but are not limited to, the actions 110 described above in FIG. 2A or the actions 240 described in FIG. 2B. At 810, information (e.g., IACA) associated with the first action and/or the content in connection with the first action of the one or more users in the organization is gathered, collected, identified, or extracted.

At 815, one or more predictive models, based on the information collected at 810, are identified, selected, or retrieved. At 820, applicability levels of the predictive models to the first action are determined, for example, using weights as described in element 235, FIG. 2B. Each predictive model suggests or predicts at least a predicted action (e.g., an action of selecting whether to switch to private mode for the users, either by action of the administrator or automatically, depending on the policy and/or preference of the organization).

At 825, one or more predicted actions from the models, determined to be used based on the applicability levels meeting a threshold level, are provided or presented to the administrator in a user interface. At 830, input from the administrator is received, selecting one predicted action or another predicted action (or modifying a predicted action or providing an action not predicted). Optionally, depending on the setting by the administrator, the predicted action may be automatically performed (e.g., on behalf of the administrator). The action selected in 830 is performed. The user's selection or input may be provided as feedback to the system, for example, to improve the system (e.g., accuracy, performance, predictions, etc.).

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 9:
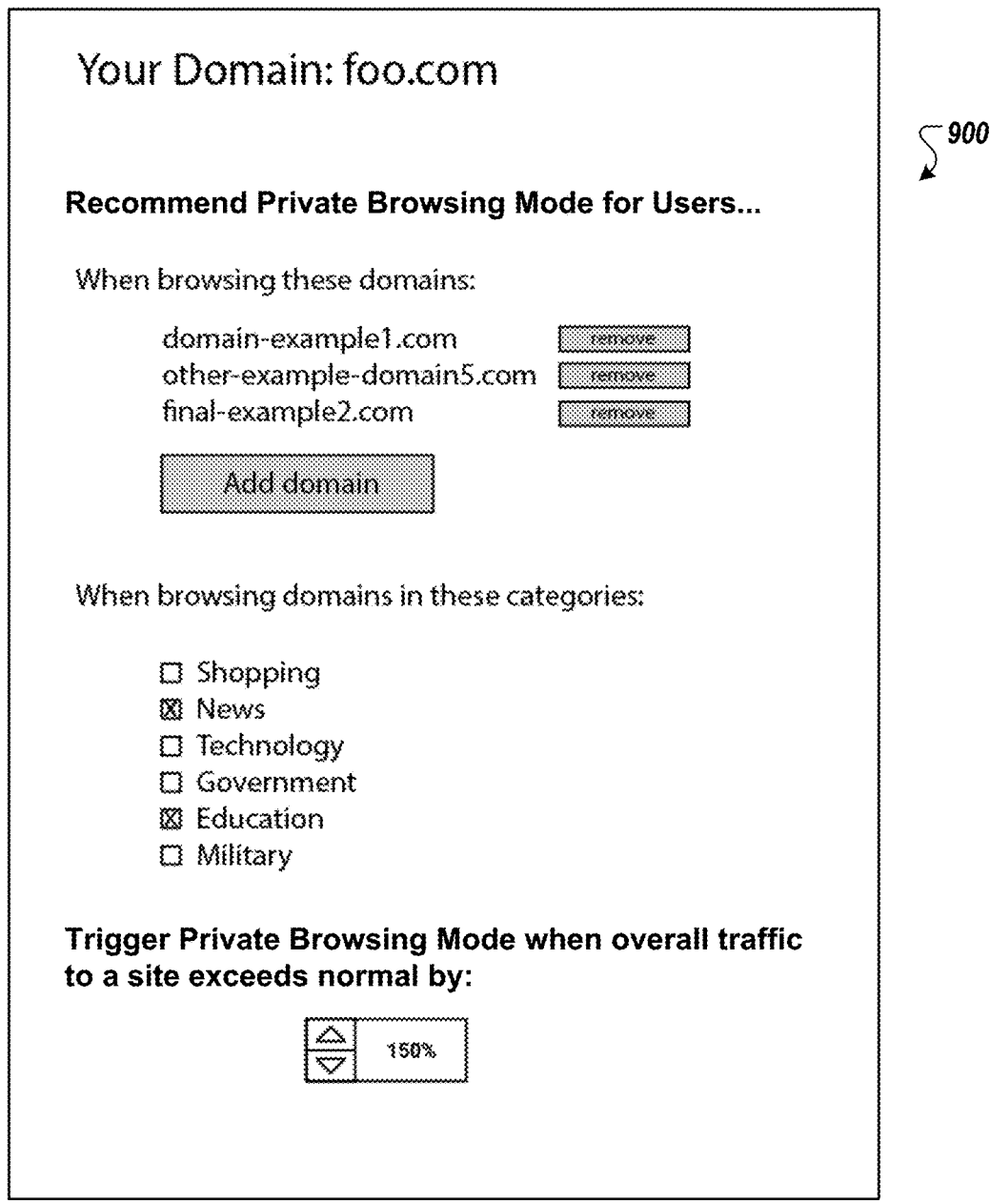
FIG. 9 shows an example of an interface according to another example implementation.

FIG. 9 shows an example of an interface 900 according to the foregoing example implementation. More specifically, an interface that may be available to an administrator is shown. The interface provides the administrator with a display of a recommendation for private browsing mode for end users, when the end users are browsing domains for which the administrator wants to recommend a private browsing mode. The administrator may remove domains that he or she has previously supplied. Further, the administrator may add a new domain for which private browsing mode is recommended as explained above. Optionally, the administrators provided with identifying information of the domain of the organization (e.g., foo.com).

Additionally, the administrator may be provided with options to automatically trigger private browsing mode. The basis for triggering private browsing mode may include, but is not limited to, categories associated with the domains. In the example of FIG. 9, the administrator is presented with categories of "Shopping", "News", "Technology", "Government", "Education", and/or "Military". Further, the administrator may set a traffic threshold for triggering the private browsing mode. More specifically, when traffic exceeds the threshold set by the administrator, for the browsing domain categories selected by the administrator, private browsing mode may be automatically triggered.

In the example of FIG. 9, the administrator has selected to trigger private browsing mode for domains in the categories of news or education, when the overall traffic from the organization to a site is at least 150% of normal traffic. However, the categories and triggers provided in FIG. 9 are examples for explanatory purposes, and other categories or triggers may be substituted therefor in the example implementations, as would be understood by those skilled in the art.

In addition to the foregoing machine learning engine being used by an administrator, according to other implementations, the machine learning engine may also be applied for other implementations. For example, a user may share information, such as documents or photos. The sharing of such information may be restricted, based on domain. One option might be to share a document outside of the domain, while another option might be to not let the user share the document outside the domain.

For example, in a document sharing product suite, an enterprise may implement a policy that controls or restricts the manner in which the documents are shared. For example, the machine learning model may provide a recommendation with respect to sharing a document based on the domain name of the recipient, or the document sharing application. The machine learning engine will provide a determination and/or recommendation with respect to restriction on the sharing based on the domain name or other information. Alternatively, instead of implementing the restriction, the machine learning engine may provide a warning to the administrator. Optionally, a user may be provided with a message, such as a warning indicating a risk of sharing (e.g., "Warning! Please be careful sharing this document with XYZ"). Similarly, the administrator may be provided with a message (e.g., "Attention! There is a surge in files being shared with the domain zzz.com").

To assist the administrator, who may have many responsibilities with respect to implementation of the security policy, the machine learning engine may automate the implementation of rules. Alternatively, the machine learning engine may simply inform the administrator or security administrator, such that the administrator can take action based on the warning or recommendation of the machine learning engine. For example, if a user or group of users are visiting a certain site in a manner that the machine learning engine has determined is indicative of activity that should result in a policy rule being enforced, such as a blocking of sharing to that side or visitation of that site, before switching the user's browser to private browsing mode, the machine learning engine may provide such a recommendation, or may automatically implement the recommendation, depending on the preference of the administrator.

According to another example implementation, when insufficient data exists for the machine learning engine to make a recommendation, other usage pattern data may be compared with information provided with the consent of the user to obtain a usage pattern that is recommended to the user, based on other usage information of other users. For example, a user may be provided with a proposed privacy setting if it is determined that there is insufficient data for the machine learning engine to recommend to the user how to share content. Due to the lack of sufficient data, as determined based on well-known techniques such as statistical significance or confidence threshold, the machine learning engine would not provide reliable recommendations to the user. In such a circumstance, the proposed privacy setting may be provided to the user based on similar usage patterns. The similar usage patterns may be determined by comparing usage or other information provided with the consent of the user, such as information associated with the location, demographic, product usage, browsing habit or other information that the user may determine to provide. The determination to provide such information may be selected by the user in a user setting interface, before the user attempts to share information. Alternatively, the user may be prompted at the time of attempted sharing to provide information.

According to one example implementation, the machine learning engine is determined to lack sufficient historical data to provide a relevant recommendation. This may be due to the lack of a performance history, and thus, the lack of training information for the machine learning engine. In the circumstance of an individual user, this may occur when a user first starts to use a product or tool. For example, if a user is accessing an online shopping site for the first time, there may not be sufficient data on the user's past usage patterns for the machine learning engine to make useful recommendations.

In this circumstance, and where the user has provided relevant information, the model attempts to generate or find the closest comparable model, and recommend that model to the user. For example, a representative persona may be generated, based on aggregated behavior of users in a demographic group. The user might provide information about their location, age or other relevant demographic information, and aggregate behavior and/or actions of users in that demographic group may be used to generate the representative persona. Further, the system may determine that based on the provided demographic information in combination with the online browsing activity, the closest comparable model of other users indicates that there is a preference to browse in private browsing mode.

The user may provide the relevant information in an account setting, as explained above. Alternatively, the user may be provided with a wizard or other relevant user interface to assist in obtaining the information.

Figure 10:
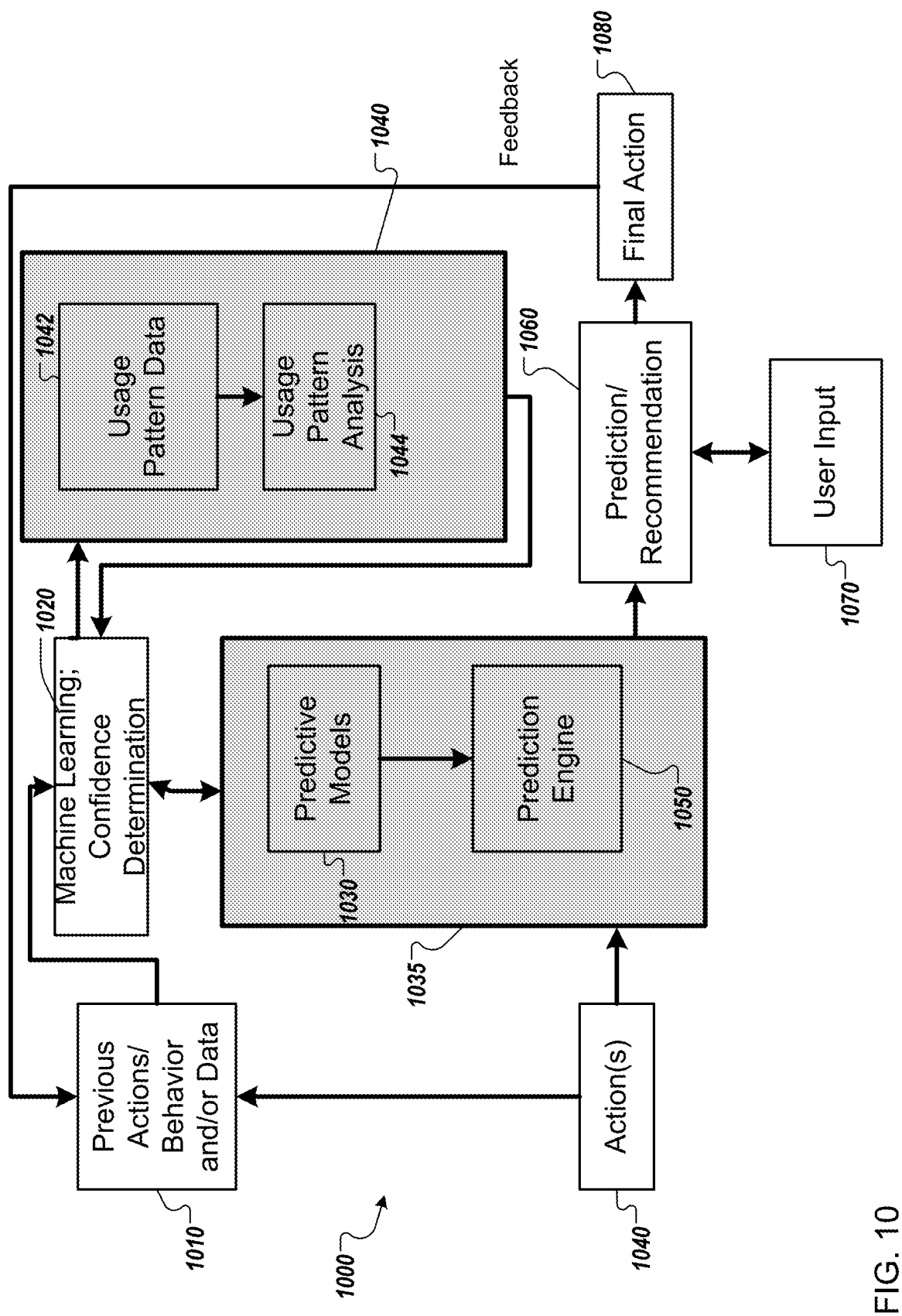
FIG. 10 shows a data flow diagram according to a further example implementation.

FIG. 10 shows a data flow diagram of an example system according to some example implementations. System 1000 may receive previous actions, behavior, and/or data 1010 as well as detected actions associated with current user activity 1040. Further, the system 1000 includes a machine learning, prediction, and confidence determination section 1020, a prediction section 1030, 1050, 1035, a usage pattern determination portion 1040, 1042, 1044, and a prediction and/or recommendation portion 1060 in conjunction with user input 1070, to output a final action 1080.

The machine learning and confidence determination 1020 receives this information associated with prior actions, behaviors, and/or data associated with the user from 1010. The machine learning and confidence determination 1020 performs a retrieves one or more predictive models, and in conjunction with the predictive models 1030 and prediction engine 1050, retrieves a model that suggests or performs the second action as explained below. Further, machine learning and confidence determination 1020 calculates a confidence associated with the machine learning result, to determine whether there is sufficient data that has been received in association with the information 1010. Where it is determined that there is sufficient data to generate a prediction using the predictive models (e.g., confidence exceeds a threshold), the machine learning and confidence determination 1020 recommends to proceed with the model generation portion 1035. Otherwise, the machine learning and confidence determination 1020 recommends to proceed with the usage pattern recommendation portion 1040. The machine learning model is applied to the usage pattern as determined by the usage pattern analysis 1044 based on the usage pattern data 1042.

According to an example implementation, a second threshold may be provided for circumstances where it is determined that the amount of data is within a range of the threshold. For example, if the threshold required to proceed with the model generation portion is a 70% confidence level, and if the confidence level of the actual data is within 10% of the 70% confidence level, or 60% to 80% confidence level, the machine learning and confidence determination 1020 may determine that both the predictive model and the usage pattern recommendation should be implemented to provide the user with the prediction and/or recommendation.

At prediction/recommendation 1060, the results of the prediction engine 1050, based on the machine learning that applies the previous user data 1010, the usage pattern data 1042, or a combination thereof, may produce a hybrid or blended output. While the foregoing percentage information is provided for illustrative purposes, these numbers are only examples, and other numbers may be substituted therefor without departing from the inventive scope. Further, other thresholds than a confidence level or a confidence interval may be used, to determine whether machine learning is appropriate, as would be understood by those skilled in the art.

The model generation portion includes, for example, using machine learning in the machine learning and confidence determination 1020 to analyze previous actions of a user, the behaviors and/or habits of the user, and data associated with the user (collectively referred to as user history 1010), and to generate predictive models 1030 associated with the user. For example, with the permission of the user, system 1000 (e.g., machine learning at 1020) uses and analyzes past observations of sharing behavior (e.g., past privacy actions, including but not limited to past sharing actions) by the user to generate one or more predictions (e.g., predictive models) of the desired audience associated with the user and/or desired sharing methods for new sharing actions by the user. History 1010 can be the history of one or more applications, websites, services of different providers, etc. that the user has given permissions or consents to gather the user's usage history and user actions.

In the model application portion of system 1000, where the machine learning and confidence determination 1020 has determined that the machine learning model is to be implemented based on history 1010, when the user attempts to share data (e.g., photo, video, etc.) or takes one or more sharing actions 1040, system 1000 (e.g., prediction engine 1050) identifies and uses one or more predictive models 1030 based on actions 1040 to provide the user with one or more predictions 1060, which may include one or more action options, such as a sharing prediction (e.g., share with the user's family by email) and one or more other sharing options (e.g., share with the user's family by a user selected method; share with user selected recipients by a predicted method of sharing through the user's social network account; a third sharing option, etc.). Actions 1040 become part of the user history 1010 if the user has given permissions to use actions 1040.

For the machine learning and confidence determination 1020 determining that the threshold for using machine learning based on history 1010 has not been met, for the determination that machine learning uses usage pattern data 1042 should be implemented, using predictive models 1030, to generate prediction or recommendation 1060, the usage pattern analysis 1044 receives, with the user consent, information associated with the user that can be compared to other usage pattern information 1042. For example, but not by way of limitation, at 1010, the user may provide demographic information, information about user preferences or behaviors, or past action information, for example. This user information is compared to usage pattern data 1042 by the usage pattern analysis 1044. For example, users having the demographic information, usage pattern, behavior, or past action information are compared for similarity to the information provided by the user at 1010. The output of usage pattern analysis 1044 is provided to machine learning and confidence determination 1020, and the predictive model is run on the usage pattern data.

Where the machine learning and confidence determination 1020 has determined that both the machine learning portion and the usage pattern analysis portion should be implemented to generate a prediction or recommendation 1060, such as in the situation where the confidence level of the data is determined to have a certain level of closeness with respect to the threshold, the results may be combined at prediction/recommendation 1060. The combination may be performed with relative weights between the result of the prediction engine 1050 and the recommendation engine 1086. For example, the weights may be provided by the machine learning and confidence determination 1020, based on the level of closeness of the confidence level to the threshold. Where the confidence level of the data is higher relative to the threshold, a higher weight may be assigned to the output of the prediction engine 1050 using the history data 1010, whereas for the confidence level of the data being lower relative to the threshold, a lower weight may be assigned to the output of the prediction engine 1050 using the history data 1010, as compared with the use of the usage pattern data 1042.

The user may provide user input 1070 via, for example, a user interface (not shown) to select or change one of the predictions/recommendation 1060 or action options. A user may select a sharing prediction predicted by the prediction engine 1050. A user may change some part of the sharing prediction or select one of the other sharing options. The user's selection becomes the final action 1080. In some implementations, the final action 1080 (e.g., the user's selection) is provided as feedback to the history 1010.

While the foregoing example implementations are provided with respect to browsing in one example, other examples may be substituted therefor without departing from the inventive scope. For example, a user may access an online shopping product or site, and the machine learning engine may not be able to make a recommendation do to the lack of sufficient historical performance data. In this circumstance, the user may be provided with a recommendation based on the activity of similar users, such as using private browsing mode while shopping, deleting history or usage activity during this period, turning off location history tracking, or turning off the geographic tagging of photos. The example implementation can also be employed in the context of sharing content, including but not limited to photos, audio, or video.

In the example implementations, the user can provide data implicitly or explicitly. For example, the user may provide the data by entering the data in the account settings. The user may also provide the data in response to one or more queries that are presented to the user. For example the user may be presented with information about demographics, preferences, or activity, and this information may be incorporated into the matching information for determining the closest sharing model. The system may also determine demographic information based on various types of user behavior. Based on the determination of the closest sharing model, the user's browser may be automatically switched to private browsing mode, or the user may be prompted as to whether they wish to switch their browser to private browsing mode. For example, if the information associated with user demographics, preferences or activity indicates that the user is shopping online for a gift, as opposed to buying a product for themselves, the private browsing mode may be invoked, so that the recipient of the gift cannot determine that the user is shopping for the gift. Further, the shopping activity of the user is protected from another user sharing the same device as the user, because the private browsing mode deletes the local browsing history once the user has terminated the browsing session.

Based on past behavior a confidence level may be calculated with respect to a prediction as to whether a user may prefer to switch their browser to private browsing mode. Different machine learning approaches can have different techniques for arriving at that, but a lot of them will have a confidence level. For example, a threshold may be selected, beyond which the user is comfortable that the machine learning engine is providing a relevant prediction based on past behavior. Alternatively, if the selected threshold is not reached, the recommendation may be provided based on the model that is based on demographics, preference or activity, as explained above. Further, a merged approach for confidence calculations may be employed, in which a prediction based on past behavior is combined with a prediction based on demographics, preference or activity, and the predictions can be weighted to produce a composite prediction. The merged approach may be used when the confidence level is above a first threshold indicative of use of demographics, preference or activity alone, and below a second threshold indicative of use of past behavior in the machine learning engine alone.

The private browsing mode referred to in the forgoing examples is an example implementation. However, other example implementations may adopt other privacy policies, recommendations or actions, including but not limited to restriction on browsing history information, sharing or blocking rules, or other privacy related actions as would be understood by those skilled in the art.

In one example implementation, a user may start a photo application, and take a photo. For example, the user may take a photo of an object that the user is interested in purchasing, such as a rug in a store. The user may view the photo that has been taken, and such as tapping a sharing object such as a button. In response to the request, the machine learning engine may recommend contacts for the user to share the photo with. Accordingly, the machine learning engine may be used to recommend one or more contacts with whom the photo should be shared, based on past usage information that the machine learning engine has processed. Further, once the user has selected the contact with whom to share the information, the machine learning engine may also provide a recommendation as to the best mode for sharing. For example, if the contact does not use the photo application for viewing photos, the machine learning engine may recommend sharing the photo with the contact via email, instead of through the application directly. As explained above, where it is determined that the machine learning engine lacks the sufficient historical information to exceed a confidence threshold, a recommendation may be produced based on similar usage patterns such as demographics as explained above, or machine learning, or a hybrid thereof.

For example, if a user has two friends named Joe and Betsy that are very close together on the social graph based on contacts, this is a strong indicator that the user as well as Joe and Betsy are all in the same social circle. If the user takes a photo of Joe, then Betsy may not be in the photo at all. In other words, the photo itself may not provide any information that Betsy is relevant. Based on a social graph developed from contacts in association with the machine learning model, a recommendation may be made by the system for the user to share the photo with both Joe and Betsy. Optionally, the system may recommend auto-completion of e-mail based on past email threads by the user. For example, based on past email threads by Joe, a recommendation may be provided for Joe to include Betsy in an email.

Figure 11:
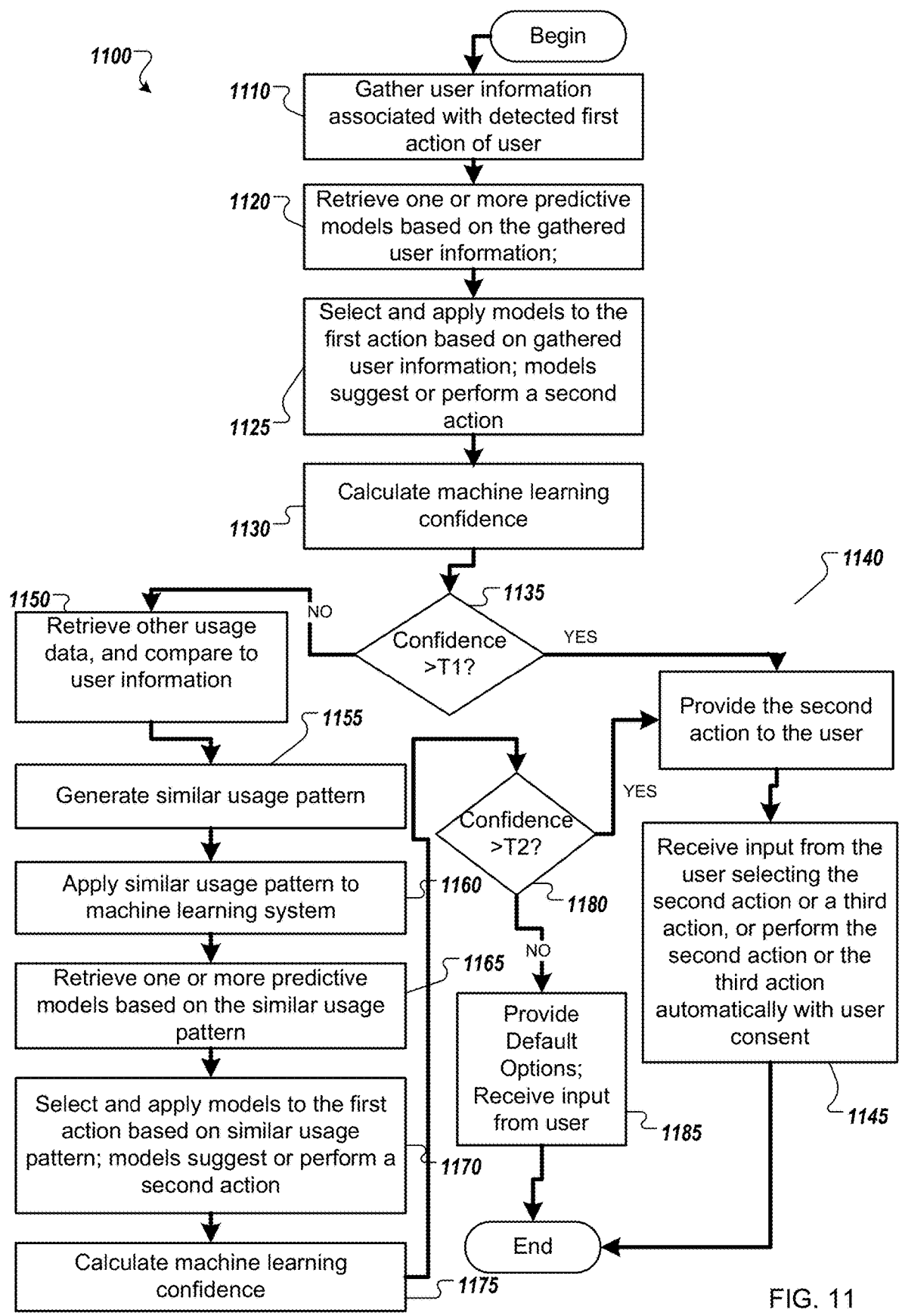
FIG. 11 shows an example of a process according to a further example implementation.

FIG. 11 shows an example of a process implementation. Generally, the process is directed to determining whether the user's own past history is more reliable than usage pattern data based on user data associated similar demographic, behavior and/or action, as an input to the machine learning model. Based on the determination, either past history data or usage pattern data, or a combination thereof, may be used for the prediction and recommendation. If neither past history data nor usage pattern data is sufficient, then a default option that does not provide a prediction or recommendation may be used, as explained below.

At 1110, an action performed by a user is detected, such as a browsing or sharing action, for example. Also at 1110, historical information associated with the detected first action of the user is obtained. For example, but not by way of limitation, this may include past actions or behavior of the user. At 1110, accordingly, information (e.g., IACA) associated with the first action and/or the content in connection with the first action is gathered, collected, identified, or extracted. Further, the information gathered, collected, identified or extracted at 1110 may optionally include, where the user has consented, information associated with demographic, behavioral, action or other usage patterns associated with the user.

At 1120, one or more predictive models based on the information collected at 1110 are identified, selected, or retrieved. At 1125, applicability levels of the predictive models to the first action are determined, for example, using weights as described in block 256, FIG. 2B. Each predictive model suggests or predicts at least a predicted action (e.g., an action of selecting who to share content with and/or an action of selecting how the content is shared by, such as using what application to share the content).

At 1130, machine learning confidence is calculated. More specifically, a calculation is made as to the level of confidence that the machine learning will provide a prediction. Level of confidence will be lower in situations where the machine learning does not have sufficient data to implement the predictive models. As explained above, this may occur in situations where the user has not engaged in sufficient activity for the application or website, or the level of activity is not frequent enough for the machine learning to properly train.

Once the machine learning confidence has been calculated at 1130, a determination is made at 1130 as to whether the confidence level exceeds a first confidence threshold T1. The first confidence threshold T1 may be set by a user, administrator, or other party having authorized access to the user data. For example, but not by way of limitation, where a user is less confident in machine learning, the user may set the first confidence threshold T1 at a higher level than previously configured. On the other hand, if a user prefers to use the machine learning, the first confidence threshold T1 may be set to a low level. Alternatively, if a user prefers to rely on usage data of other users, the first confidence threshold T1 may be set to a low level.

While the confidence level refers to exceeding T1, the example implementations are limited thereto, and other relationships between the confidence level and T1 may be substituted therefor. For example, but not by way of limitation, the confidence level may meet or exceed, or be less than, T1.

If the confidence level is determined to exceed the first confidence threshold T1 at 1128, the predictive model is implemented at 1140-1145. At 1140, one or more predicted actions from the models, determined to be used based on the applicability levels meeting an applicability threshold level, are provided or presented in a user interface. At 1145, input from a user is received selecting one predicted action or another predicted action (or modifying a predicted action or providing an action not predicted). The action selected in 1145 is performed. The user's selection or input may be provided as feedback to the system, for example, to improve the system (e.g., accuracy, performance, predictions, etc.).

On the other hand, if it is determined at 1135 that the confidence does not exceed T1, then the process branches to perform operations 1150-1175, as explained below.

Turning to operations 1150-1155, at 1150, relevant usage data associated with other users is retrieved. For example, this may include usage data of other users having similar demographic, preference, behavior, or action information, when compared with the information provided by or consented to be provided by the user. Similarly, the usage data of other users would also be provided with the consent of the user.

At 1150, the other usage data retrieved and compared to the user information (e.g., demographic, behavior, action) obtained at 1110, to determine a relative degree of similarity. Various techniques may be used to perform this comparison. For example, but not by way of limitation, pattern recognition techniques, clustering analysis, or other data analysis techniques may be employed, as would be understood by those skilled in the art.

At 1160, the similar usage pattern information is applied to the machine learning system. At 1165, one or more predictive models based on the information obtained in 1155 are identified, selected, or retrieved. At 1125, applicability levels of the predictive models to the first action are determined, for example, using weights as described in block 256, FIG. 2B. Each predictive model suggests or predicts at least a predicted action (e.g., an action of selecting who to share content with and/or an action of selecting how the content is shared by, such as using what application to share the content), based on the similar usage pattern obtained in 1150-1160.

At 1175, machine learning confidence is calculated with respect to the similar usage pattern applied to the machine learning model. More specifically, a calculation is made as to the level of confidence that the machine learning will provide a prediction. The level of confidence will be lower in situations where the machine learning does not have sufficient data from the similar usage pattern to implement the predictive models. For example, a user may have a very rare demographic, behavior or action pattern, such that the confidence associated with 1150-1170 is low. As explained above, this may occur in situations where the user has not engaged in sufficient activity for the application or website, or the level of activity is not frequent enough for the machine learning to properly train.

Once the machine learning confidence has been calculated at 1175, a determination is made at 1180 as to whether the confidence level exceeds a second confidence threshold T2. Similar to above with T1, the second confidence threshold T2 may be set by a user, administrator, or other party having authorized access to the user data. For example, but not by way of limitation, where a user is less confident in machine learning or the similar usage patterns, the user may set the second confidence threshold T2 at a higher level than previously configured. On the other hand, if a user prefers to use the machine learning with similar usage patterns, the second confidence threshold T2 may be set to a low level.

At 1180, if the confidence level exceeds the second threshold T2, 1140 and 1145 are performed, as explained above. However, if the confidence level does not exceed the second threshold T2, then the user may be provided with default options at 1185. For example, the user may not be provided with a recommendation regarding private browsing mode, or with respect to recommendations for sharing information.

In some examples, process 1100 may be implemented with different, fewer, or more blocks. Process 1100 may be implemented as computer executable instructions, which can be stored on a medium, loaded onto one or more processors of one or more computing devices, and executed as a computer-implemented method.

Figure 12:
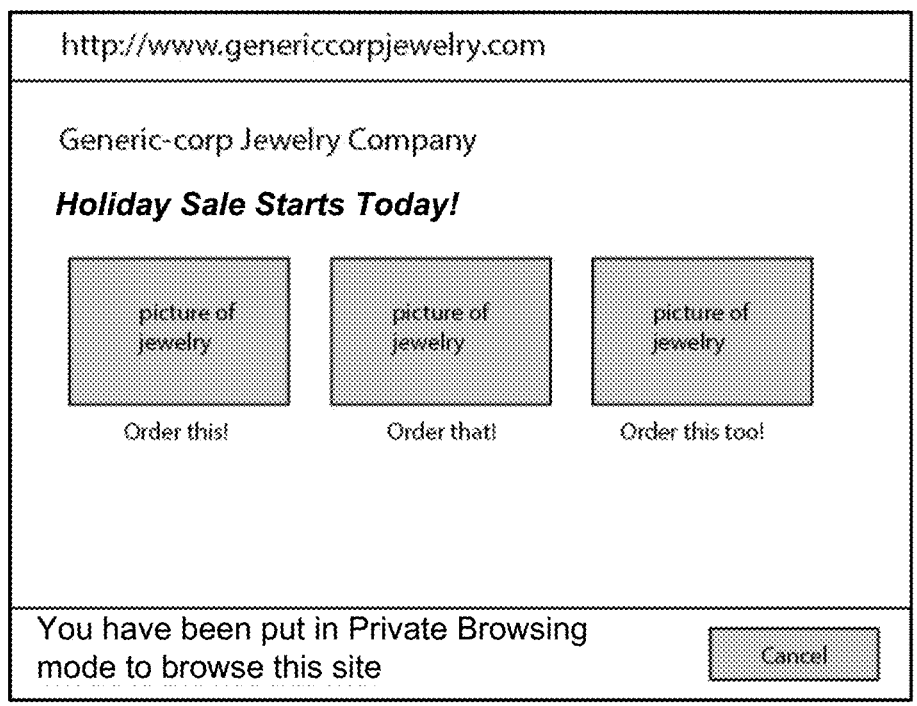
FIG. 12 shows an example of an interface according to a further example implementation.

FIG. 12 shows an example of an interface 1200 according to the above example implementation. More specifically, a browser is provided for a user. The user selects a URL. Further, the user may engage in online behavior on the URL, in this case online shopping. If the user has provided demographic information, the system may engage in the forgoing processes discussed with respect to FIGS. 10 and 11 above. More specifically, the user actions are received by a machine learning portion of the system, driven by past actions of the user, to generate a recommendation or privacy, and a confidence. If the confidence exceeds a threshold, then machine learning is applied to generate the recommendation. If the confidence does not exceed the threshold, then actions may be input into the machine learning system that are driven based on the actions of users that are similar to the user, as explained above.

For example, an aggregation of user activity associated with a prescribed demographic may be used to produce a recommendation and confidence. If this recommendation results in a confidence greater than a threshold, then machine learning may be used as explained above. However, if the confidence in this step is less than the threshold, then the model does not have sufficient data, either based on the users own actions in the past, or actions of users having similar demographic, behavior or action.

In the example of FIG. 12, the user is shopping for jewelry on a website. The user is browsing photos of jewelry that have been provided. Based on the operation of either the machine learning or similar user pattern comparison, the system has placed the user in private browsing mode for the site. The user is provided with an option to override (e.g., "Cancel).

The various foregoing example implementations shown in FIGS. 7-12 may be implemented in the example environment shown in FIG. 5 as well as the example computing environment shown in FIG. 6, with an example computing device suitable for use in some example implementations.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used so that personally identifiable information is removed. For example, a user's identity may be treated so that no personally identifiable information can be determined for the user, or a user's geographic location may be generalized where location information is obtained (such as to a city, ZIP code, or state level) so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method comprising:
   receiving information associated with a first action performed by a user within a domain of a web site;
   in response to the first action performed by the user, generating, using machine learning, a first predictive model and a privacy preference to govern a respective action of the user within the domain of the web site subsequent to the first action, the machine learning generating, as outputs, a respective predictive model and the privacy preference based on inputs of the received information and one or more known historical actions associated with the received information, the first predictive model configured to suggest a second action as the respective action;
   determining a first applicability level of the first predictive model to the first action;
   when the first applicability level satisfies a first threshold level and fails to satisfy a second threshold level exceeding the first threshold level:
      presenting, to the user, the second action as the respective action subsequent to the first action;
      receiving, from the user, a first selection of the second action or a third action to be the respective action; and
      executing the first selection from the user;
   when the first applicability level satisfies the second threshold level, performing the second action as the respective action without the first selection from the user; and
   when the first applicability level fails to satisfy the first threshold level and fails to satisfy the second threshold level:
      receiving additional information associated with the first action performed by the user within the domain of the website;
      generating, using machine learning, a second predictive model, the second predictive model configured to suggest a fourth action as the respective action;
      determining a second applicability level of the second predictive model to the first action performed by the user within the domain of the website; and
      when the second applicability level satisfies a third threshold level:

presenting, to the user, the fourth action as the respective action subsequent to the first action;
receiving, from the user, a second selection of the fourth action or a fifth action to be the respective action; and
executing the second selection from the user.

2. The method of claim 1, wherein:
the first action and the fourth action comprise browsing the website in an open mode, and
the second action and the fifth action comprise:
predicting a user preference to browse the website in a private mode;
presenting, to the user, an option to switch from the open mode to the private mode; and
tuning the machine learning based on the option selected by the user.

3. The method of claim 1, wherein the first action and the fourth action comprise identifying content and the second action and the fifth action comprise selecting an application to process the content.

4. The method of claim 1, wherein the first action and the fourth action comprise accessing the website using the domain and the second action and the fifth action comprise selecting a mode for a browser application to access the website.

5. The method of claim 1, wherein the outputs of the machine learning dictate at least one type of activity for the respective action, the at least one type of activity comprising a browsing activity, a sharing activity on an online social circle of a social network, and an electronic communication activity.

6. The method of claim 1, wherein the determining the first applicability level of the first predictive model to the first action comprises:
performing a weighted calculation of attributes associated with the first predictive model; and
determining a combination of at least some of the weighted calculation of the attributes meet the first threshold level.

7. The method of claim 1, wherein input from the user selecting the second action or a third action modifies the first predictive model.

8. A method comprising:
receiving information associated with a first action performed by a user of a plurality of users belonging to an organization, the first action occurring within a domain of a website;
in response to the first action performed by the user, generating, using machine learning, a first predictive model associated with a privacy preference of the organization to govern a respective action of the user within the domain of the website subsequent to the first action, the machine learning generating, as outputs for an administrator of the organization, a respective predictive model associated with the privacy preference based on inputs of the received information and a past privacy actions associated with the received information, the first predictive model configured to suggest a second action as the respective action;
determining a first applicability level of the first predictive model to the first action;
when the first applicability level satisfies a first threshold level and fails to satisfy a second threshold level exceeding the first threshold level:
presenting, to the administrator, the second action as the respective action subsequent to the first action;
receiving, from the administrator, a first selection of the second action or a third action to be the respective action; and
executing the first selection from the administrator;
when the first applicability level satisfies the second threshold level, performing the second action as the respective action without the first selection from the administrator; and
when the first applicability level fails to satisfy the first threshold level and fails to satisfy the second threshold level:
receiving additional information associated with the first action performed by the user within the domain of the website;
generating, using machine learning, a second predictive model, the second predictive model configured to suggest a fourth action as the respective action;
determining a second applicability level of the second predictive model to the first action performed by the user within the domain of the website; and
when the second applicability level satisfies a third threshold level:
presenting, to the administrator, the fourth action as the respective action subsequent to the first action;
receiving, from the administrator, a second selection of the fourth action or a fifth action to be the respective action; and
executing the second selection from the administrator.

9. The method of claim 8, wherein:
the first action and the fourth action comprise browsing the website in an open mode, and
the second action and the fifth action comprise:
predicting a administrator preference to browse the website in a private mode;
presenting, to the administrator, an option to switch from the open mode to the private mode; and
tuning the machine learning based on the option selected by the administrator.

10. The method of claim 8, wherein the first action and the fourth action comprise identifying content and the second action and the fifth action comprise selecting an application to process the content.

11. The method of claim 8, wherein the first action and the fourth action comprise accessing the website using the domain and the second action and the fifth action comprise selecting a mode for a browser application to access the website.

12. The method of claim 8, wherein the outputs of the machine learning dictate at least one type of activity for the respective action, the at least one type of activity comprising a browsing activity, a sharing activity on an online social circle of a social network, and an electronic communication activity.

13. A method comprising:
receiving information associated with a first action by a user during an activity session comprising a sequence of actions;
in response to the first action, generating, using machine learning, a first predictive model configured to suggest a second action as a respective action subsequent to the first action in the sequence of actions of the user, the machine learning generating, as outputs, a respective model based on inputs of the received information associated with the first action by the user;

determining a first confidence level associated with an application of the first predicative model to the first action and the received information;

when the first confidence level satisfies a first threshold:
  presenting, to the user, the second action as the respective action;
  executing the second action or a third action as the respective action based on an first input from the user; and when the first confidence level fails to satisfy the first threshold:
  generating a similar usage pattern based on usage data associated with one or more other users having a degree of similarity with respect to the received information;
  generating, using machine learning, a second predictive model configured to suggest a fourth action as the respective action based on inputs of the first action and the similar usage pattern;
  determining a second confidence level associated with a respective application of the second predictive model to the first action and the similar usage pattern; and
  when the second confidence level satisfies a second threshold:
    presenting, to the user, the fourth action as the respective action; and
    executing the fourth action or a fifth action based on second input from the user.

14. The method of claim 13, wherein the presenting the second action to the user is based on a degree of sharing of content associated with the first action exceeding a prescribed applicability level.

15. The method of claim 13, further comprising when the second confidence level fails to satisfy the second threshold, providing a default option to the user.

16. The method of claim 13, wherein the first input of the user comprises consent of the user.

17. The method of claim 13, wherein:
  the first action and the fourth action comprise browsing one or more online sites in an open mode, and
  the second action and the fifth action comprise:
    predicting a user preference to browse the one or more online sites in a private mode;
    presenting, to the user, an option to switch from the open mode to the private mode; and
    tuning the machine learning based on the option selected by the user.

18. The method of claim 13, wherein the first action and the fourth action comprise identifying content, and the second action and the fifth action comprise selecting an application to process the content.

19. The method of claim 13, wherein the first action and the fourth action comprise accessing a website, and the second action and the fifth action comprise selecting a mode of a browser to access the website.

* * * * *